(12) United States Patent
Yamazaki et al.

(10) Patent No.: US 6,679,503 B2
(45) Date of Patent: Jan. 20, 2004

(54) CHUCK UNIT FOR MACHINE TOOL

(75) Inventors: Tsunehiko Yamazaki, Aichi-ken (JP);
Haruhiko Koike, Gifu-ken (JP);
Noboru Yamamoto, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/037,211

(22) Filed: Jan. 4, 2002

(65) Prior Publication Data

US 2002/0053774 A1 May 9, 2002

(30) Foreign Application Priority Data

Jan. 11, 2001 (JP) ........................................ 2001-004149
Sep. 5, 2001 (JP) ........................................ 2001-269361

(51) Int. Cl.$^7$ ............................................. B23B 31/12
(52) U.S. Cl. ........................ 279/123; 269/266; 279/4.1; 279/133
(58) Field of Search ............................... 279/133, 110, 279/4.1, 4.12, 123, 119, 121, 152; 82/165; 269/32, 266, 267, 268, 287; 451/381, 385, 397, 398

(56) References Cited

U.S. PATENT DOCUMENTS

| 3,868,102 | A | * | 2/1975 | Pevar ........................... 269/26 |
| 4,572,564 | A | * | 2/1986 | Cipolla ......................... 294/88 |
| 4,896,914 | A | * | 1/1990 | Stevens ........................ 294/88 |
| 5,137,263 | A | * | 8/1992 | Savoie et al. ................ 269/266 |
| 5,407,185 | A | * | 4/1995 | Zehnpfennig et al. ....... 269/266 |

FOREIGN PATENT DOCUMENTS

| DE | 4239180 A1 | * | 7/1993 | ............ B23Q/3/06 |
| DE | 197 555 17 | | 1/1999 | |
| EP | 899061 A2 | * | 3/1999 | ............. B25B/1/24 |

* cited by examiner

Primary Examiner—Daniel W. Howell
(74) Attorney, Agent, or Firm—Duane Morris LLP

(57) ABSTRACT

A chuck unit for a machine tool is capable of holding a workpiece installed on a spindle by workpiece holding members that move in a radial direction with respect to an axial center. Workpiece holding rods are provided at the workpiece holding member and move radially. Screw operating portions are operated by a rotating operation jig at an outer peripheral side of the chuck unit. A workpiece end face abutment moves and holds the workpiece in the axial direction.

18 Claims, 20 Drawing Sheets

F I G. 1 3
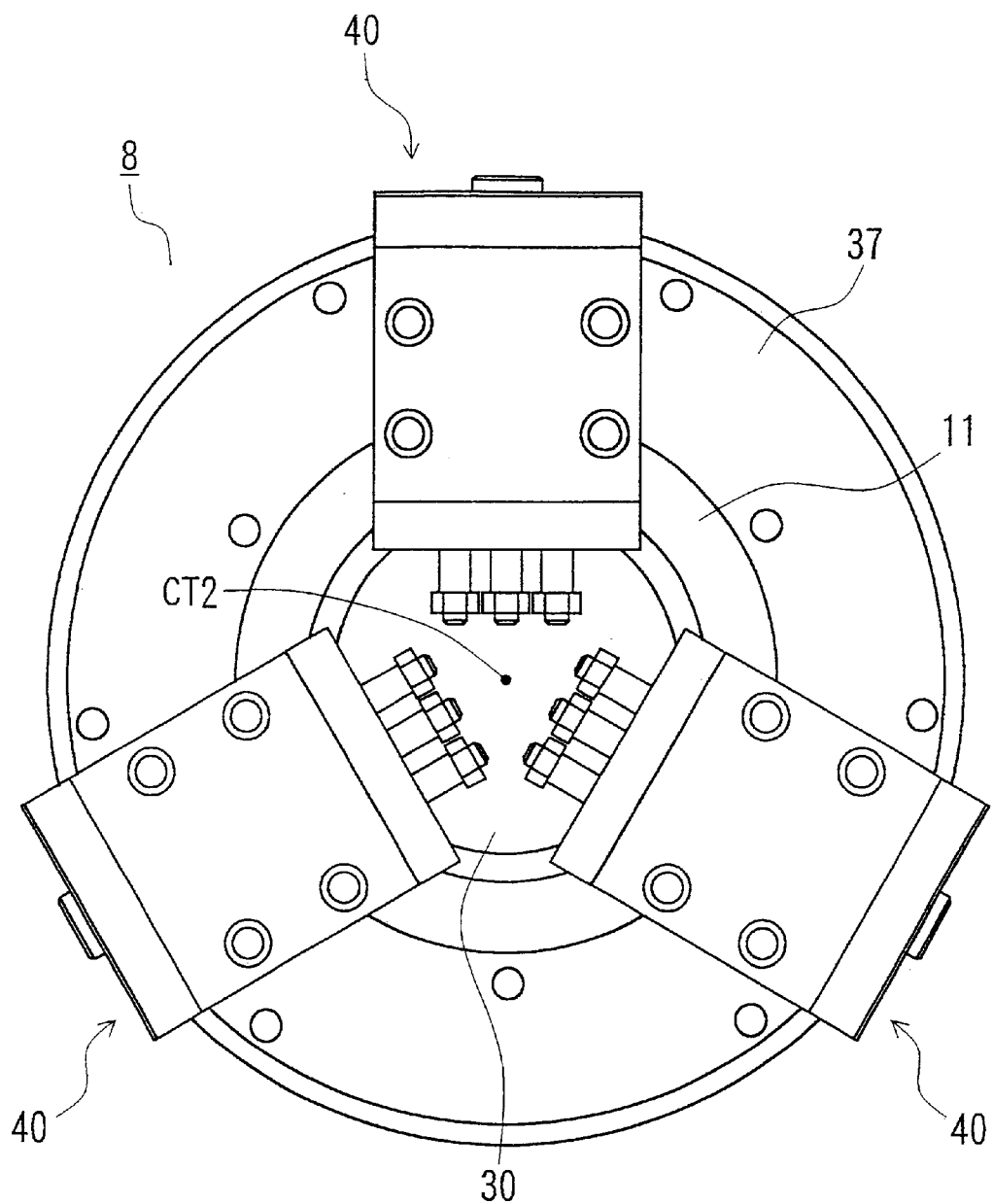

CHUCK UNIT FOR MACHINE TOOL

BACKGROUND OF THE INVENTION

This invention relates to a chuck unit for a machine tool capable of holding a workpiece at a section which is circular or non-circular.

A conventional chuck unit for a machine tool to be installed on a lathe or the like is usually produced for holding a workpiece having a section that is circular. It may not be possible to hold a workpiece having a section that is a polygon or an irregular shape, except in a chuck with special or customized jaws.

Recently, the machining capabilities of machine tools, such as lathes, have become more complicated and have advanced highly. Various machining operations, such as milling machining, fraise machining, and drilling machining, are possible in addition to mere lathe turning.

For efficient machining, it may be desirable to complete all the machining steps needed on a workpiece in a given machine tool in such a way that a workpiece is subjected to a first routine of machining while held by a first chuck unit, and then is delivered to a second chuck unit facing the first chuck unit. The second chuck unit holds the workpiece by the portion that was machined during the first routine of machining. A second routine of machining is then executed on the portion which has not yet been machined, such as the portion that had been held by the first chuck unit.

In such a case, the portion of the workpiece to be held by the second chuck unit, namely the portion on which the first routine of machining has already been finished, may not always have a circular section. It may have various shapes. In fact, due to increasingly diverse machining operations in recent years, the sectional shape may not be circular in most cases. Nevertheless, it is necessary to execute the second routine of machining while properly holding even such a workpiece.

In a conventional method of using so-called raw jaws, it is possible to machine single use raw jaws for every change of a workpiece. This is not efficient, and the jaws cannot be used to machine various kinds of workpieces. There is a need for a chuck unit capable of properly holding a workpiece having various sectional shapes without troublesome work, such as machining of raw jaws.

German patent No. 19755517 discloses a technique wherein a plurality of workpiece holding rods are provided at a workpiece holding member, such as a jaw. The rods are free to move in a radial direction, and a workpiece having various shapes can be held by such workpiece holding rods. At least two such workpiece holding members need to be provided in a chuck unit to hold the workpiece. The particular structure of the workpiece holding rods and workpiece holding members, and how they are to be driven, and how driving operations of the workpiece holding rod are executed, and the nature of the fixing operation, are problems which remain to be solved.

If the workpiece holding rods and workpiece holding members operate such that every workpiece holding member or workpiece holding rod needs to be moved and driven, then setting and holding the workpiece takes some time. If moving and driving the workpiece holding rod to a predetermined position, and an operation for then fixing the workpiece, are executed with respectively different driving means, it may be necessary to operate driving means at two places concerning each workpiece holding member. The choices are troublesome, and often impractical.

The object of the present invention is to provide a chuck unit for machine tool capable of properly holding a workpiece having various sectional shapes, not limited to a circular section, and capable of executing moving and driving operations and fixing operations using workpiece holding rods, by a simple operation driven from outside the workpiece holding parts, taking the above-mentioned circumstances into consideration.

SUMMARY OF THE INVENTION

It is an aspect of the invention that a chuck unit for a machine tool is capable of holding a workpiece, the chuck unit being installed on a spindle that is rotatably supported. The chuck unit comprises a main body that is free to rotate and drive, defining an axial center. Two or more sliding members are provided on said main body. The sliding members are free to move in a radial direction with respect to said axial center of the main body, through sliding member driving means. A workpiece holding member is provided on said each sliding member. The workpiece holding member is capable of moving together with said sliding member. A plurality of workpiece holding rods are provided on the workpiece holding member. The workpiece holding rods are free to move and drive in the radial direction relative to the axial center. The workpiece holding rods are driven by a fluid cylinder driving means. The fluid cylinder driving means has a cylinder formed in each such workpiece holding member. The workpiece holding rod is engaged with said cylinder and is free to move and reciprocate. A member moving mechanism is provided between the sliding member and the workpiece holding member, such that said respective workpiece holding members are free independently to move and drive in the radial direction by operation of the member moving mechanism. The member moving mechanism has an adjustable screw mechanism rotatably provided between said sliding member and said workpiece holding member, such that the workpiece holding member is free to move and drive with respect to said sliding member in said radial direction, by operating the adjustable screw mechanism. The adjustable screw mechanism has a screw operation portion, operable by a rotating jig, rotatably provided at said machine tool, on an outer peripheral side of said chuck unit. A workpiece end face abutting means is provided at said main body. The abutting means is free to move, drive and become fixed in the axial direction relative to the main body. A workpiece end face abutting face is formed at a top end of said workpiece end face abutting means, at a right angle with respect to said axial center direction of the main body.

The workpiece holding rods as described can hold a workpiece at a portion that has been machined or has various sectional shapes, not limited to shapes having a circular section. Machining is possible on the workpiece, even assuming a machined and/or noncircular sectional shape, without the need for raw jaws to hold an irregular or already machined sectional portion. Thus, a first routine of machining and a second routine of machining can be successively executed with a single machine tool, including first holding one portion of the workpiece while machining another, delivering the workpiece between spindles, and then holding the now-machined portion while machining the portion that was previously held. The efficiency of machining work can be rapidly improved.

The workpiece holding members can be respectively independently moved by the member moving mechanism. This makes it readily possible to hold workpieces that have any of a variety of different sectional shapes. The adjustable screw mechanism of the member moving mechanism has a screw operating portion that is rotatable and drivable by the rotating operation jig . Accordingly, the position of the member moving mechanism can be adjusted mechanically rather than by hand, which contributes to automation of the machining operations.

The workpiece holding member can rapidly be moved to a position approaching the workpiece by the member moving mechanism. It is possible to adapt to a new workpiece diameter by moving the workpiece holding rod, and not necessarily by changing the length of its moving stroke. As a result, the workpiece holding member can be compact.

The workpiece also can be held because the workpiece end face is abutted by the workpiece end face abutting face. Workpieces are securely held even if they have irregular shapes.

According to another aspect, the sliding member driving means has first members that are free to move in the axial center direction, and an engagement portion formed at said first members. The sliding member is connected with said engagement portion. The workpiece holding member can be easily driven through the sliding members by driving and reciprocating the first members in the axial center direction.

A plurality of said sliding members can be connected with said engagement portions, and a plurality of said sliding members can be provided that are free synchronously to move through said engagement portions by moving said first members in said axial center direction. All of the workpiece holding members can be synchronously driven by driving the first members in this way.

Furthermore, a piston can be engaged with the cylinder of the workpiece holding means. The piston is free to drive and reciprocate from an outside-in, by a piston operating means. An operating portion is provided at said piston operating means, operable by a rotating operation jig rotatably and drivably provided on the machine tool. The workpiece holding rod can be easily operated from outside the workpiece holding means by operating the piston operating means through the rotating operating jig.

The operating portion can be located on an outer peripheral side of the chuck unit. The operating portion can be operated from the side face of the chuck since it is located on the outer peripheral side of the chuck. Interference between the operating portion and the workpiece during machining can thus be prevented.

In another aspect, the cylinder can have a plurality of sub-cylinders. The workpiece holding rod then is engaged with said each sub-cylinder. The sub-cylinder makes it possible to optionally choose the size of the workpiece holding rod, according to the machining forms and workpiece to be held and machined.

A workpiece core clamping member can be provided at said main body, with an axial center corresponding to the axial center of said main body.

The workpiece can be prevented from shifting from a core when the workpiece is held by the workpiece holding rods with the workpiece core clamping member.

An energizing means is provided for the workpiece holding rods, for energizing said workpiece holding rods from said axial center side in the direction of a retracted position.

The workpiece holding rods can be positively retractable to retreated positions by the energizing means. This prevents interference between the workpiece and the workpiece holding rods when the workpiece holding rods project and otherwise might interfere at the time of a following workpiece holding operation.

The cylinders of said respective workpiece holding members are communicated and connected with each other among the respective workpiece holding members. Thus, the cylinders of all the workpiece holding members can be driven at one time. This makes operation of the workpiece holding rod easier, at the time of delivering of the workpiece, even if a workpiece having a different sectional shape is held every time. The workpiece can be delivered in a short time.

Although the cylinders of said respective workpiece holding members are communicated and connected with each other among the respective workpiece holding members, the piston operation means can be provided at only one of said respective workpiece holding members. The structure of the chuck unit can thus be made simple.

The chuck unit can be installed on a spindle that is rotatably supported. The chuck unit includes a main body that is free to rotate and drive on an axial center as its center. Two or more sliding members provided on said main body are free to move in a radial direction with respect to said axial center of said main body through sliding member driving means. A workpiece holding member is provided on said each sliding member, being free to move together with said sliding member. A plurality of workpiece holding rods provided on said workpiece holding member, are free to move and drive in said radial direction with said axial center as its center through a cylinder. Outside fluid supply means are connected with said cylinder, to supply said cylinder with fluid for driving one or more of the workpiece holding rods from an outside. Fixing means are provided at said workpiece holding rod. Working fluid supply means are connected with said fixing means, for working and releasing working the fixing means. The outside fluid supply means has valve means for changing a supply of said fluid for driving the workpiece holding rod with respect to said cylinder; and said valve means also can serve as said working fluid supply means.

A workpiece can be held by the workpiece holding rods through a portion machined in various sectional shapes that can be non-circular shape. A workpiece with a non-circular sectional shape can be machined without raw jaws, but by holding a machined irregular sectional portion. It is therefore possible to execute a first routine of machining and a second routine of machining successively with a single machine tool, delivering the workpiece between spindles. The efficiency of machining work can be rapidly improved.

The workpiece holding rods can be fixed by the fixing means of the workpiece holding rod, when in the state of holding the workpiece. So, it is not necessary to change the workpiece holding rod positions to follow the outer shape of the workpiece every time when holding a further similar workpiece. The time for delivering workpieces can be shortened and productivity can be improved.

The outside fluid supply means can serve as the valve means for controlling supply of the fluid for driving the workpiece holding rod and the supply means of the working fluid. The chuck unit can be made small. Besides, moving and driving operations and fixing operations on the workpiece holding rods, can be executed by merely operating the outside fluid supply means. So, the operation finishes in a short time and automation with a robot is easy.

The valve means has a driving force receiving portion for receiving a driving force for driving said valve means from outside of the chuck. The driving force receiving portion also serves as a driving force receiving portion for receiving driving force for driving said working fluid supply means from outside of the chuck.

Driving of the valve means and supply of the working fluid also can be executed with the same operating means in the operation from outside, and the operation is simple.

According to another aspect, a chuck unit for a machine tool, capable of holding a workpiece, installed on a spindle rotatably supported, comprises:

a main body that is free to rotate and drive with an axial center as its center;

two or more sliding members provided on said main body, the sliding members being free to move in a radial direction with respect to said axial center of said main body through sliding member driving means;

a workpiece holding member provided on each said sliding member, free to move together with said sliding member;

a plurality of workpiece holding rods provided on said workpiece holding member, the workpiece holding rods being free to move and drive in said radial direction with said axial center as its center through a cylinder;

outside fluid supply means connected with said cylinder, to supply said cylinder with fluid for driving workpiece holding rod from outside of the main body;

fixing means for said workpiece holding rod provided at said workpiece holding rod;

working fluid supply means connected with said fixing means, for working and releasing the fixing means;

said cylinders of said respective workpiece holding members communicating and being connected with one another among said respective workpiece holding members; and said fixing means of said respective workpiece holding members communicated and connected with each other among said respective workpiece holding members.

A workpiece can be held by the workpiece holding rods as described, at a portion machined in various sectional shapes, including non-circular shapes. The workpiece with such possibly non-circular sectional shape can be machined without the need for raw jaws, namely by holding the machined irregular (potentially non-circular) section. In this way, a first routine of machining and a second routine of machining can be successively executed with a single machine tool, including delivering the workpiece between spindles in the process, and the efficiency of machining work can be rapidly improved.

The workpiece holding rods can be set when holding a workpiece, so as to fix the rods to hold a shape. Thus, it is not necessary to re-set the workpiece holding rods to follow the shape of a workpiece every time a workpiece is held, when a plurality of the workpieces having the same shape are successively machined. The time to complete workpieces can be shortened and productivity improved.

Furthermore, the cylinders and the fixing means of each workpiece holding member are respectively communicated and connected with one another. So, all of the workpiece holding members can be driven by one operative fluid supply means and fixing means associated with one the workpiece holding rod.

The outside fluid supply means have a valve means for controlling supply of said fluid for driving the workpiece holding rod with respect to said cylinder. The valve means also serves as the working fluid supply means.

The outside fluid supply means and said working fluid supply means for working and releasing said fixing means preferably are provided at only one of the workpiece holding members installed on said main body. Therefore, the structure of the chuck unit can be made simple.

The workpiece holding member and said sliding member can be unitedly formed with each other. So, the chuck unit can be made smaller.

BRIEF DESCRIPTION OF THE DRAWINGS

FIG. 13 is a front elevation of the chuck unit for lathe as shown in FIG. 12;

DESCRIPTION OF THE PREFERRED EMBODIMENTS

Figure 1:
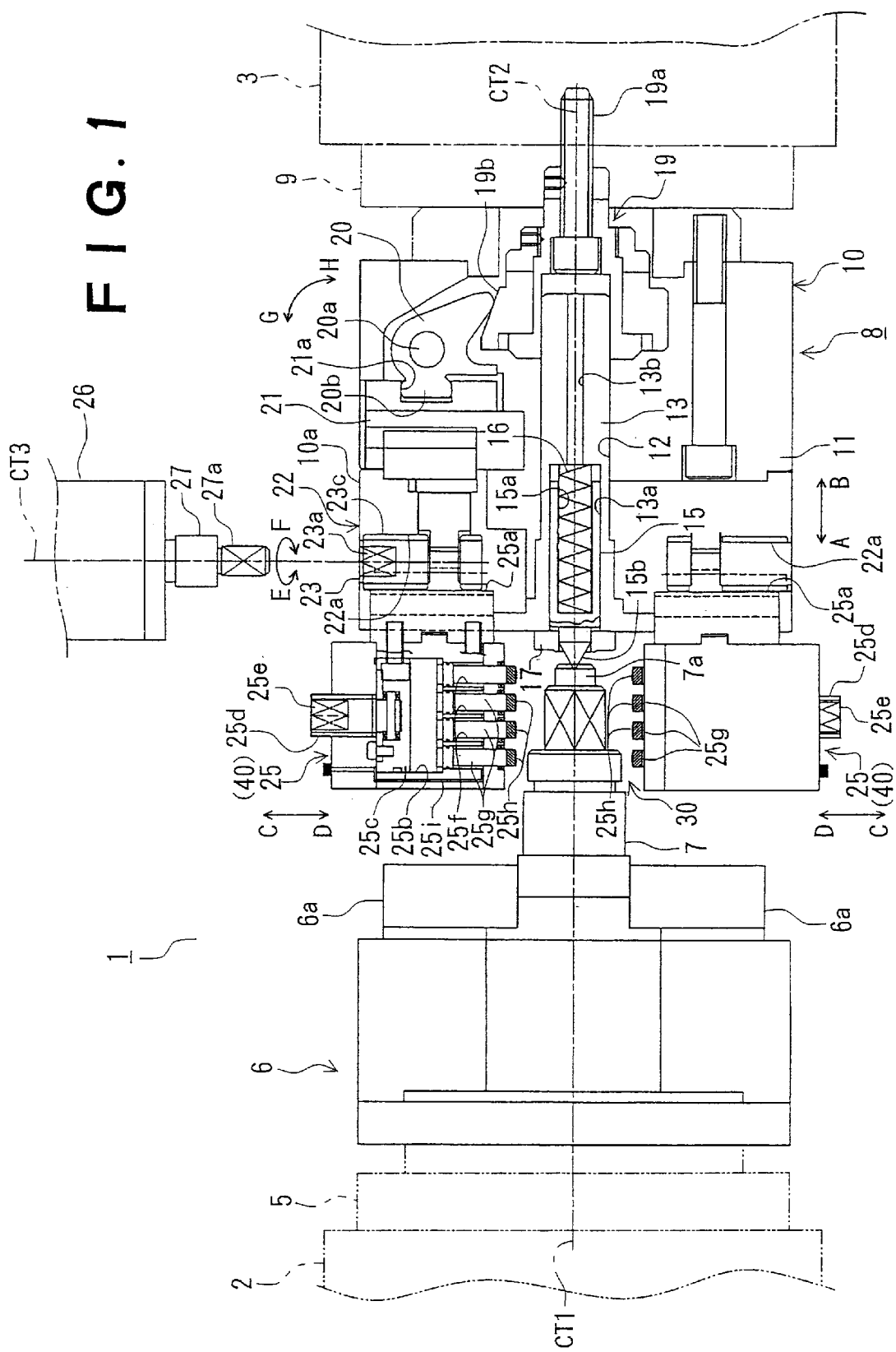
FIG. 1 is a view for showing an example of a machine tool having a chuck unit for a lathe, applying the present invention.
Figure 2:
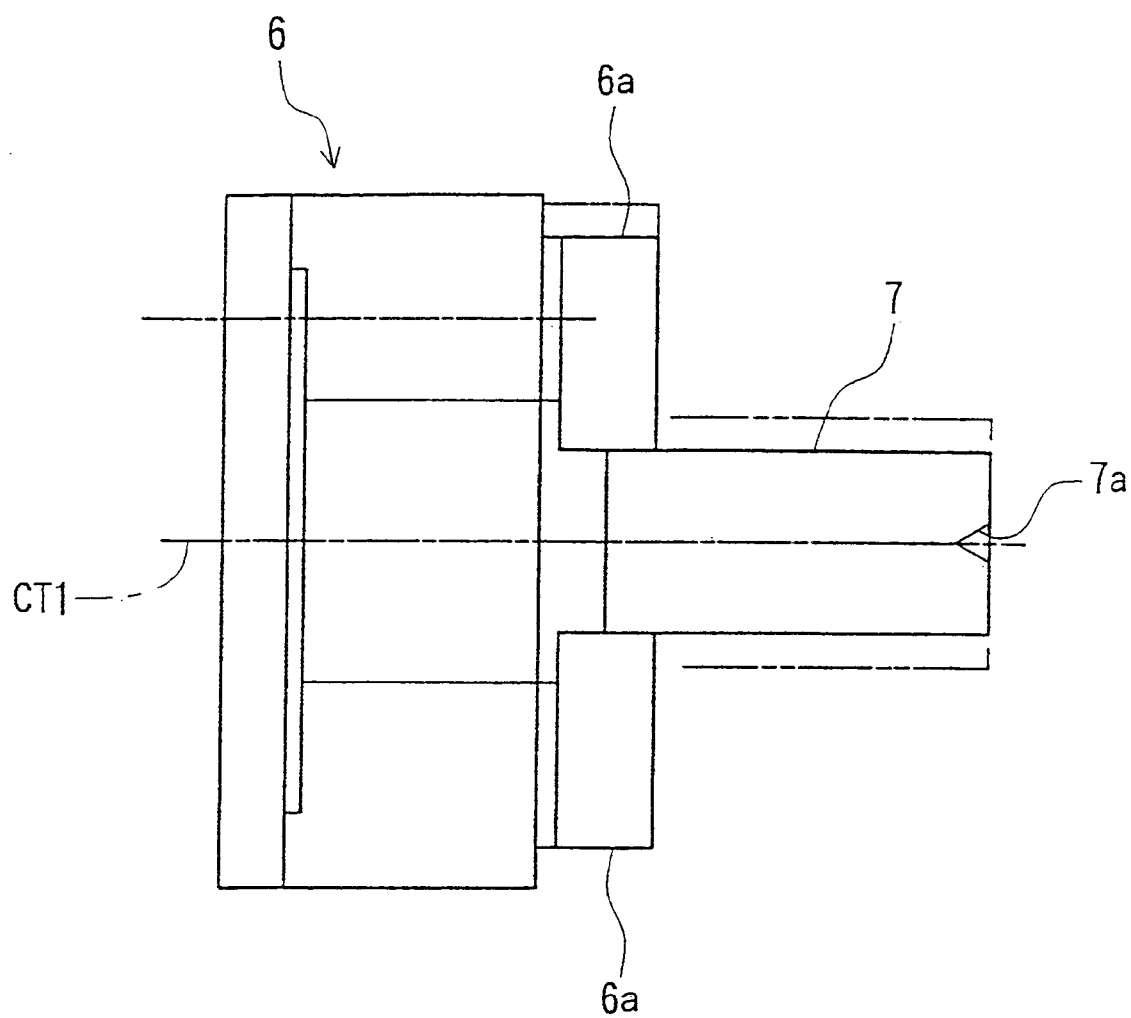
FIG. 2 is a view for showing a routine of machining on a workpiece using the chuck unit for lathe of FIG. 1.

Embodiments of the present invention will now be explained hereinafter, referring to the drawings.

FIG. 1 shows an example of a machine tool having a chuck unit for a lathe, applying the present invention. FIG. 2 through FIG. 11 are views for showing steps of machining a workpiece using the chuck unit for lathe of FIG. 1.

A lathe 1, which is a machine tool, has spindle stocks 2, 3 provided facing each other, as shown in FIG. 1. The spindle stocks 2, 3 are free to move and drive in a direction shown by arrows A and B, defining a Z axis direction. At the spindle stock 2, a spindle 5 is provided. Spindle 5 is free to rotate and drive with an axial center CT1 parallel to the Z axis as its center and is free to be positioned at an optional rotational angle (that is, at a C axis angle) with the axial center CT1 as its center. On a top end of the spindle 5, a chuck 6 is installed. Two or more jaws 6a are provided at the chuck 6, and are free to move and drive in a direction as shown by arrows C and D which is a radial direction with the axial center CT1 as its center.

A spindle 9 is provided at the spindle stock 3, and is free to rotate and drive with an axial center CT2 (that corresponds with the axial center CT1) parallel to the Z axis as its center, and is free to be positioned at an optional rotational angle (that is, at the C axis angle) with the axial center CT2 as its center. On a top end of the spindle 9, a chuck 10 is installed, comprising a chuck unit 8.

The chuck 10 has a main body 11 in the shape of a cylinder. At a center portion of the main body 11, a through hole 12 penetrates, its center corresponding with the axial center CT2. A sleeve 13 is inserted in the through whole 12. On the left hand of the sleeve 13 in the figure, a hole 13a is formed. An oil pressure supply hole 13b, has a center corresponding with the axial center CT2, and is connected with the hole 13a. A center point part 15 is inserted in and engaged with the hole 13a, being free to slide in the direction as shown by the arrows A and B, its axial center corresponding with the axial center CT2.

The center point part 15 has a hole 15a. A coil spring 16 is provided between the wall face of the left end of the hole 15a in the figure and the wall face of the right end of the hole 13a of the figure so as to contract, and the coil spring 16 urges the center part 15 in the direction as shown by the arrow A. On the left end of the center part 15 of the figure, a projecting portion 15b in the shape of a circular cone is formed, and a stop ring 17 is installed on the left end face of the sleeve 13 of the figure.

A base 19 is installed on a base end portion of the right hand of the sleeve 13 of the figure, and a bar 19a is provided at the base 19, its axial center corresponding with axial center CT2. Three engagement faces 19b are formed on an outer peripheral portion of the base 19 at a pitch of 120° with the axial center CT2 as its center, corresponding to first jaws described hereinafter. A cam 20 supported by an axis 20a in a direction as shown by arrows G and H is free to oscillate and is engaged with each engagement face 19b. Three cams 20 are formed at the pitch of 120° with the axial center CT2 as the center, and an engagement portion 20b is formed at each cam 20.

First jaws 21 are supported by the main body 11, and are free to move in the direction shown by the arrows C and D, which is a radial direction relative to axial center CT2. Three first jaws 21 are provided, respectively facing the above-mentioned cams 20. On the right hand side of each first jaw 21 in the figure, a channel 21a is formed, and the engagement portion 20b of the above-mentioned cam 20 engages with the channel 21a. A second jaw 22 is installed on each first jaw 21, and an adjusting screw 23 engages with the second jaw 22, being free to rotate.

The adjusting screw 23 has an adjusting hole 23a for receiving a wrench or key, and is disposed at an outer peripheral side face 10a of the chuck 10. A feed screw thread 23c is formed on the surface of the adjusting screw 23.

Furthermore, a third jaw 25 is provided at the second jaw 22, and is free to move in the direction as shown by the arrows C and D, which is a radial direction relative to axial center CT2. On the right side of the third jaw 25 of the figure, a screw 25a engages with the feed screw 23c of the adjusting screw 23. The third jaw 25 has a cylinder 25b, and a piston 25c is inserted into and engaged with the cylinder 25b, being free to slide in the direction as shown by the arrows C and D.

An operation rod 25d, fitting in the third jaw 25, is engaged with the piston 25c, and is free to relatively rotate. A top end of the operation rod 25d in the figure projects at the outer peripheral face 10a side of the chuck 10. Furthermore, at its top end portion, an adjusting hole 25e is provided for receiving a wrench or key. On the lower hand of the cylinder 25b of the figure, two or more sub-cylinders 25f are formed, and a piston rod 25g engages with each sub-cylinder 25f, being free to independently slide along the direction as shown by the arrows C and D which is the axial center direction of the sub-cylinder 25f.

A tool rest 26 is provided on the upper hand of the spindle stocks 2, 3 of the figure, being free to move and drive in the direction as shown by the arrows A and B which define a Z axis direction and in the direction as shown by the arrows C and D which define a Y axis direction orthogonal to the Z axis. On the tool rest 26, a chuck jaw operation jig 27 can be attachably and detachably installed in addition to general tools, such as a cutting tool, a drilling tool or a milling tool.

At the top end of the chuck jaw operation jig 27, an operation portion 27a is provided, and has a quadrangle section. The chuck jaw operation jig 27 can drive and rotate the operation portion 27a through a drive unit (not shown) at an optional angle in the direction as shown by arrows E and F with an axial center CT3 as its center by installing on the tool rest 26, similar to the rotational tool.

Figure 3:
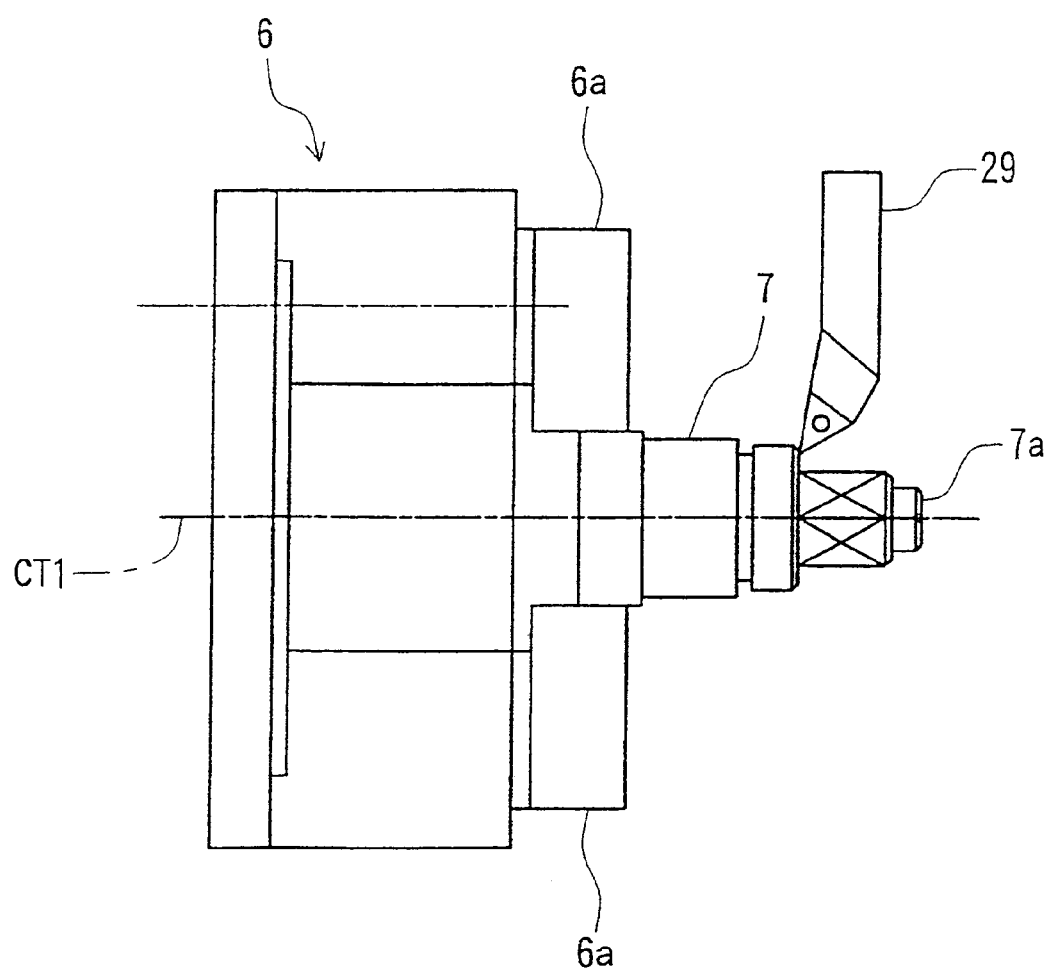
FIG. 3 is a view for showing a routine of machining on a workpiece using the chuck unit for lathe of FIG. 1.

The lathe 1 has the structure as mentioned before. In order to machine a part from a raw material workpiece 7 which section is a circular shape using the lathe 1, the raw material workpiece 7 is installed on the chuck 6 on the side of spindle stock 2 through jaws 6a. A center hole 7a is formed on an end face of the raw material workpiece 7 by a center hole drill (not shown). The center hole drill can be is installed on the tool rest 26 initially for this purpose. Subsequently, a cutting tool, such as a cutting tool 29 or a rotating tool, such as a drilling tool or milling tool, is installed on the tool rest 26 so as to execute a first routine or sequence of machining operation steps on the raw material workpiece 7, as shown in FIG. 3. During this routine, the raw material workpiece 7 can be held by a normal chuck 6, since its section is typically circular in shape. In the state that it is held, the first routine of machining can be smoothly executed on a right hand portion of the raw material workpiece 7.

Figure 4:
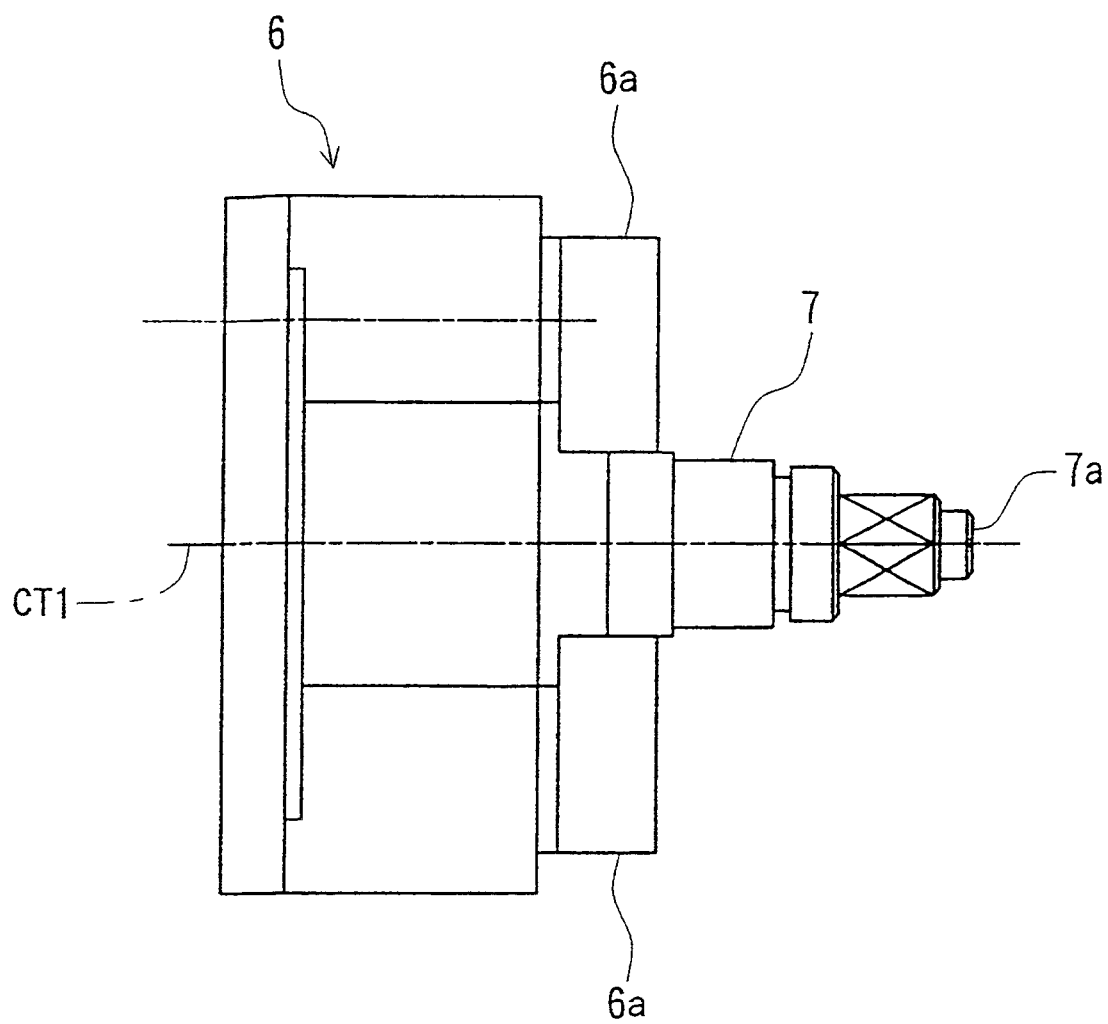
FIG. 4 is a view for showing a routine of machining on a workpiece using the chuck unit for lathe of FIG. 1.

After the first routine of machining finishes on the right hand portion of the raw material workpiece 7 of the figure in this way as shown in FIG. 4, the workpiece 7 after the first routine of machining is delivered to the chuck unit 8 on the spindle stock 3 side. The left hand portion of the workpiece 7 was previously held by the chuck 6. In order to machine the left hand portion of the workpiece 7, it is necessary to hold the right hand portion of the workpiece 7, namely the portion that has already been machined and might have any of various shapes, differing from a circular shape, as a result of the first routine of machining, with the chuck 10.

To transfer the workpiece, the chuck 6 of the side of spindle stock 2, holding the workpiece 7 on which the first routine of machining has finished, is moved in the direction as shown by the arrow B and the top end of the workpiece 7 is inserted into a workpiece holding space 30 formed enclosing by two or more third jaws 25. Jaws 25 then are in an open state of the chuck unit 8 of the spindle stock 3 side, as shown in FIG. 1. At this time, the third jaws 25, the second jaws 22 and the first jaws 21 are in the open state, moved in the direction as shown by the arrow C in the figure to the utmost. The piston rods 25g of the third jaw 25 are in the state that they are moved in the direction as shown by the arrow C in the figure, to the utmost, by the operation rod 25d through the piston 25c.

A workpiece holding portion 25h of the top end of the piston rod 25g is then in the most open state in the radial direction with respect to the axial center CT2, that is, in the state that it is moved in the direction as shown by the arrow C to the utmost. The top end of the workpiece, on which the first routine of machining has finished, is smoothly inserted into the workpiece holding space 30 without interfering with the piston rods 25g.

When the top end of the workpiece on which the first routine of machining finishes is inserted into the workpiece holding space 30 formed between the third jaws 25 in the chuck unit 8, the projecting portion 15b of the centering part 15 is inserted into and engages with the center hole 7a of the top end of the workpiece 7. Furthermore, the center part 15 is slightly moved in the direction as shown by the arrow B against the elasticity of the coil spring 16 by driving the spindle stock 2 in the direction as shown by the arrow B. The workpiece 7 is correctly held between the chuck 6 and the center part 15, its axial center corresponding with the axial center CT1 or CT2 of the spindle 5 or 9.

Subsequently, the chuck jaw operation jig 27 is installed on the tool rest 26, and in this state, the tool rest 26 is moved and driven in the direction as shown by the arrows A and B and in the direction as shown by the arrows C and D, and the operation portion 27a of the top end of the chuck jaw operation jig 27 is moved in the direction of the adjusting screw 23 of the second jaw 22 so as to insert into the adjusting hole 23a.

When the chuck jaw operation jig 27 is driven by a predetermined rotational angle in the direction as shown by the arrow F in this state, the adjusting screw 23 is also rotated in the direction as shown by the arrow F so as to gradually move the third jaw 25 in the direction as shown by the arrow D, that is, in the axial center CT2 direction through the feed screw 23c and the screw 25a. In this way, the third jaw 25 is gradually moved in the direction of the workpiece 7 just before the workpiece holding portion 25h of the top end of the piston rod 25g of the third jaw 25 comes into contact with the outer peripheral portion of the workpiece 7.

At this point, driving and rotating of the adjusting screw 23 by the chuck jaw operation jig 27 is stopped. The chuck jaw operation jig 27 is retracted in the direction shown by arrow C. Besides, the chuck unit 8 is driven and rotated a predetermined rotational angle around axial center CT2 so as to come adjacent and to face the adjusting screw 23, which has been driven with the chuck jaw operation jig 27. By similar operations, the operation portion 27a of the chuck jaw operation jig 27 is inserted into the adjusting hole 23a of the adjusting screw 23. The workpiece holding portion 25h of the third jaw 25 connected with the adjusting screw 23 continues being moved near to a point of contact with the outer peripheral portion of the workpiece 7.

Figure 5:
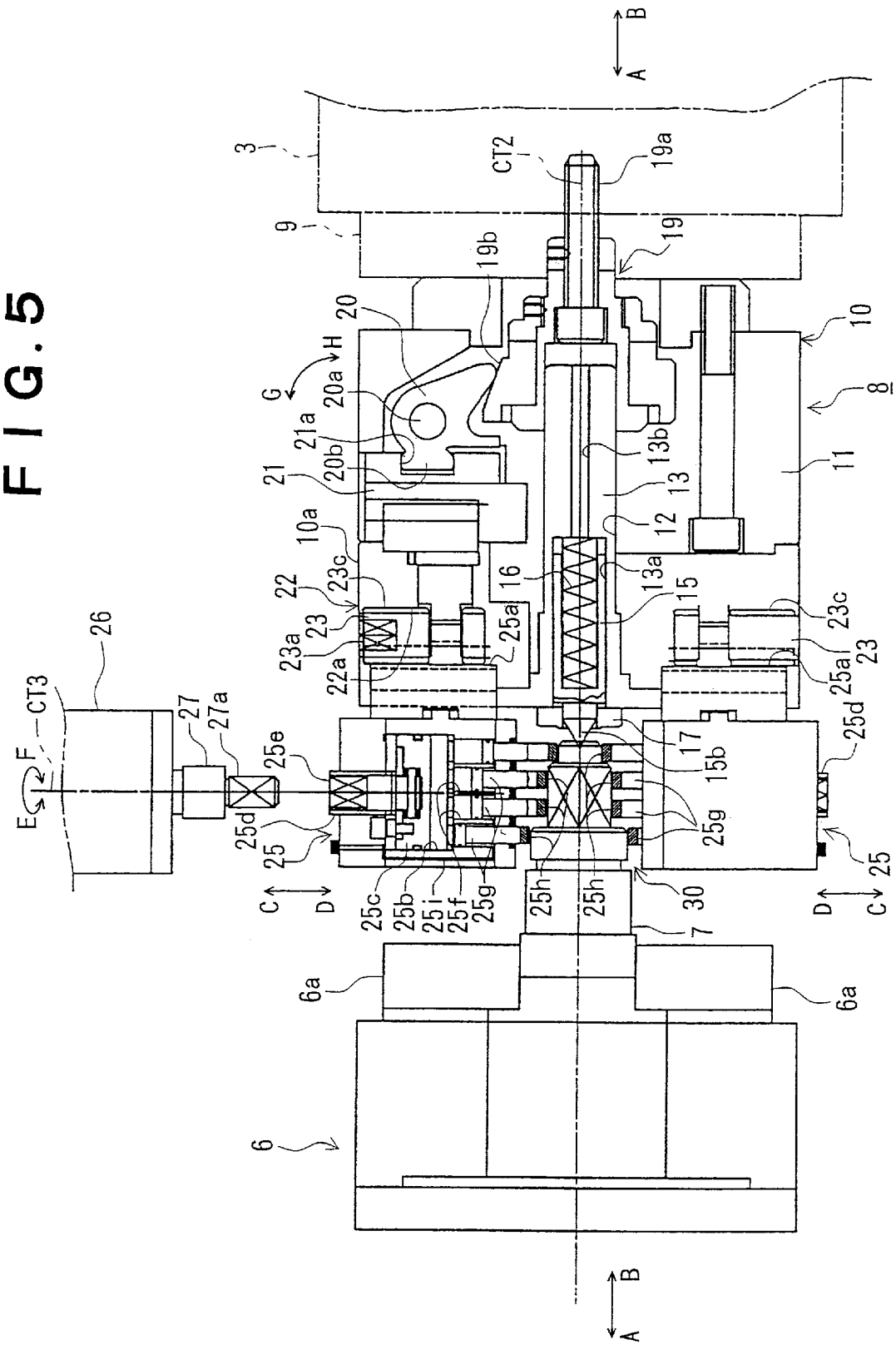
FIG. 5 is a view for showing a routine of machining on a workpiece using the chuck unit for lathe of FIG. 1.

As the workpiece holding portion 25h of the corresponding third jaw 25 continues being moved toward before contact with the outer peripheral portion of the workpiece 7 by the chuck jaw operation jig 27, the remaining adjusting screws 23 operate in a similar way, and the operation portion 27a of the top end of the chuck jaw operation jig 27 is moved in the direction of the operation rod 25d of the third jaw 25 so as to insert in the adjusting hole 25e, as shown in FIG. 5.

In this state, the chuck jaw operation jig 27 is driven by a predetermined rotational angle in the direction shown by arrow F. Then, the operation rod 25d, fitting in the third jaw 25, is also rotated in the direction as shown by the arrow F, and the operation rod 25d is gradually moved in the direction as shown by the arrow D, that is, in the direction of the axial center CT2, together with the piston 25c of the top end thereof. Then, the piston rod 25g in the sub-cylinder 25f is moved in the direction of the axial center CT2 by the operation of hydraulic cylinder 25b.

At this point, the workpiece holding portion 25h of the top end of each piston rod 25g abuts the machined outer peripheral portion of the workpiece 7, at which the first routine of machining has been finished, and further movement in the direction of the axial center CT2, that is, in the direction as shown by the arrow D is prevented at this time. But, the piston rod 25g which has not yet abutted on the workpiece 7 of the two or more piston rods 25g is moved in the axial center CT2 direction, independently of piston rods 25g, which are already abutting, and stops moving when the workpiece holding portion 25h of the top end thereof abut against the machined outer peripheral portion of the workpiece 7.

Contact pressure is not increased between the workpiece holding portion 25h of the piston rod 25g, already in the abutting state, and the outer peripheral portion of the workpiece 7, so long as the situation is maintained that at least one piston rod 25g has not abutted against the outer peripheral portion of the workpiece 7 (i.e., the piston rods 25g have not yet closed on the outer surface of the workpiece 7). The energy of oil pressure in cylinder 25b is consumed for driving of the piston rods 25g, which have not yet closed on the workpiece 7. Thus, inadvertently strong pressure does not act on the workpiece 7 from the piston rods 25g that have already contacted the workpiece 7. When closed, the workpiece 7 is held with its axial center at the axial center CT1 or CT2 of the spindle 5 or 9.

In this way, all piston rods 25g of the three part jaw 25 abut on and contact with the outer peripheral portion of the workpiece 7 along the machined shape of the workpiece 7. The workpiece 7 is not bent even if the piston rods 25g abut against the machined contour of the workpiece 7 since the workpiece 7 is correctly held by the center 15 and the chuck 6, corresponding its axial center and the axial center CT1 or CT2 of the spindle 5 or 9 with each other, as already mentioned.

When all piston rods 25g of the third jaw 25 lightly abut on the workpiece 7, the driving and the rotating of the operation rod 25d by the chuck jaw operation jig 27 is stopped. The chuck jaw operation jig 27 is retracted in the direction shown by arrow C. And, the chuck unit 8 is driven and rotated a predetermined rotational angle around axial center CT2 so as to face the operation rod 25d of the third jaw 25, adjacent to the third jaw 25.

In this state, the operation portion 27a of the chuck jaw operation jig 27 is engaged with the operation rod 25d in a similar way to the above-mentioned case. All piston rods 25g of the jaw 25 are lightly abutted on the workpiece 7 by the chuck jaw operation jig 27. A similar operation is executed on the piston rods 25g of the remaining three part jaws 25. As the result, all piston rods 25g are lightly abutted against and in contact with the outer peripheral portion of the workpiece 7, the piston rods 25g enclosing the portion of the workpiece 7 on which the first routine of machining was finished. The workpiece holding portions 25h of the plural piston rods 25g enclose radially inwardly toward the axial center of workpiece 7, as shown in FIG. 5.

Figure 6:
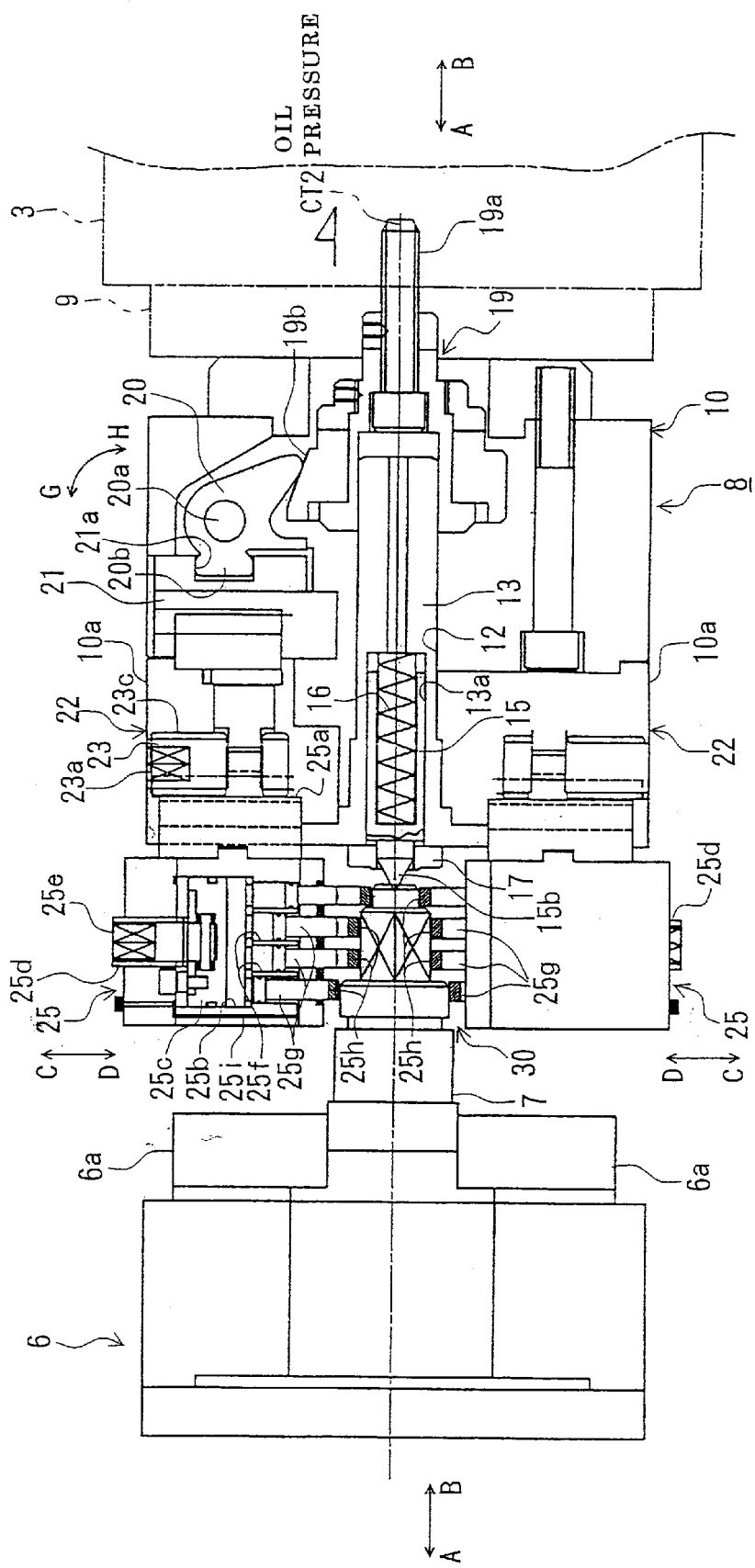
FIG. 6 is a view for showing a routine of machining on a workpiece using the chuck unit for lathe of FIG. 1.

Subsequently, the chuck jaw operation jig 27 is retracted in the direction as shown by the arrow C. The bar 19a of the base 19 is pulled in the direction as shown by the arrow B through a hydraulic actuator (not shown), as shown in FIG. 6. The cam 20, engaging with the engagement face 19b of the base 19, oscillates in the direction as shown by the arrow G through the axis 20a. Together with this, three first jaws 21 are synchronously moved in the direction as shown by the arrow D, that is, in the direction of axial center CT2, through the engagement portion 20b and the channel 21a. Then, the second jaw 22 and the third jaw 25 installed on the first jaw 21 are also moved in the direction as shown by the arrow D similarly, and the piston rods 25g of the three third jaws 25 are synchronously pressed in the direction of axial center CT2.

The capacity of the cylinder 25b of the third jaw 25 at which the piston rods 25g are provided is fixed, since the piston 25c is fixed by the operation rod 25d fitting in the third jaw 25, and the oil in cylinder 25b is substantially incompressible. Taking the above-mentioned facts into consideration, each piston rod 25g, which at first contacted workpiece 7 with light contact pressure, bears against the outer surface of workpiece 7 with a pressure corresponding to the movement stroke of the third jaw 25, in the direction as shown by the arrow D, with movement of the third jaw 25 in the direction of axial center CT2. The workpiece 7 becomes strongly held by the three third jaws 25 through many piston rods 25g of these third jaws 25.

The piston rods 25g of each third jaw 25 communicate with each other in a single cylinder 25b. Therefore, the contact pressure of each piston rod 25g against workpiece 7 is constant and does not depend on the extent of movement or stroke between its present position and the position at which the piston rod 25g first contacted the outer surface of workpiece 7. Besides, before movement of the first jaw 21 in the direction shown by the arrow D, each piston rod 25g was placed in position against the outer surface of workpiece 7. Therefore, any change in position with increase in contact pressure of the piston rods 25g of each third jaw 25 is almost negligible.

From this arrangement, the contact pressure of piston rods 25g against workpiece 7 is almost equal when the workpiece 7 is held by the third jaws 25 together with retraction of the first jaws 21. The workpiece 7 is held by the three third jaws 25 with equal holding pressure.

Figure 7:
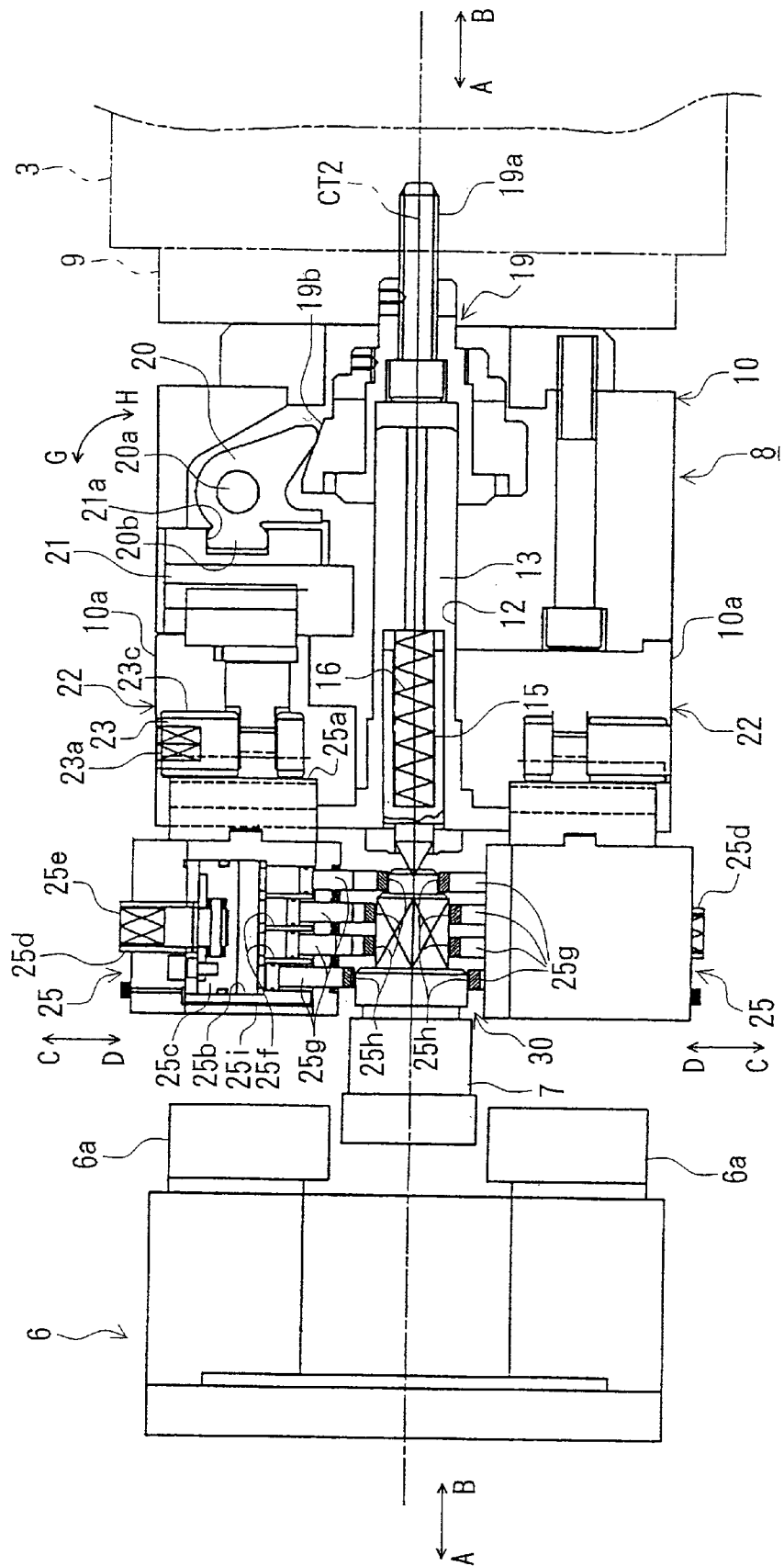
FIG. 7 is a view for showing a routine of machining on a workpiece using the chuck unit for lathe of FIG. 1.

Subsequently, the jaws 6a of the chuck 6 of the spindle stock 2 side are released in the direction as shown by the arrow C. The workpiece 7 on which the first routine of machining finished is held securely by the chuck unit 8, with the axial center of the workpiece corresponding to the axial center CT2 of the spindle 9 due to the third jaws 25, and as shown in FIG. 7.

Figure 8:
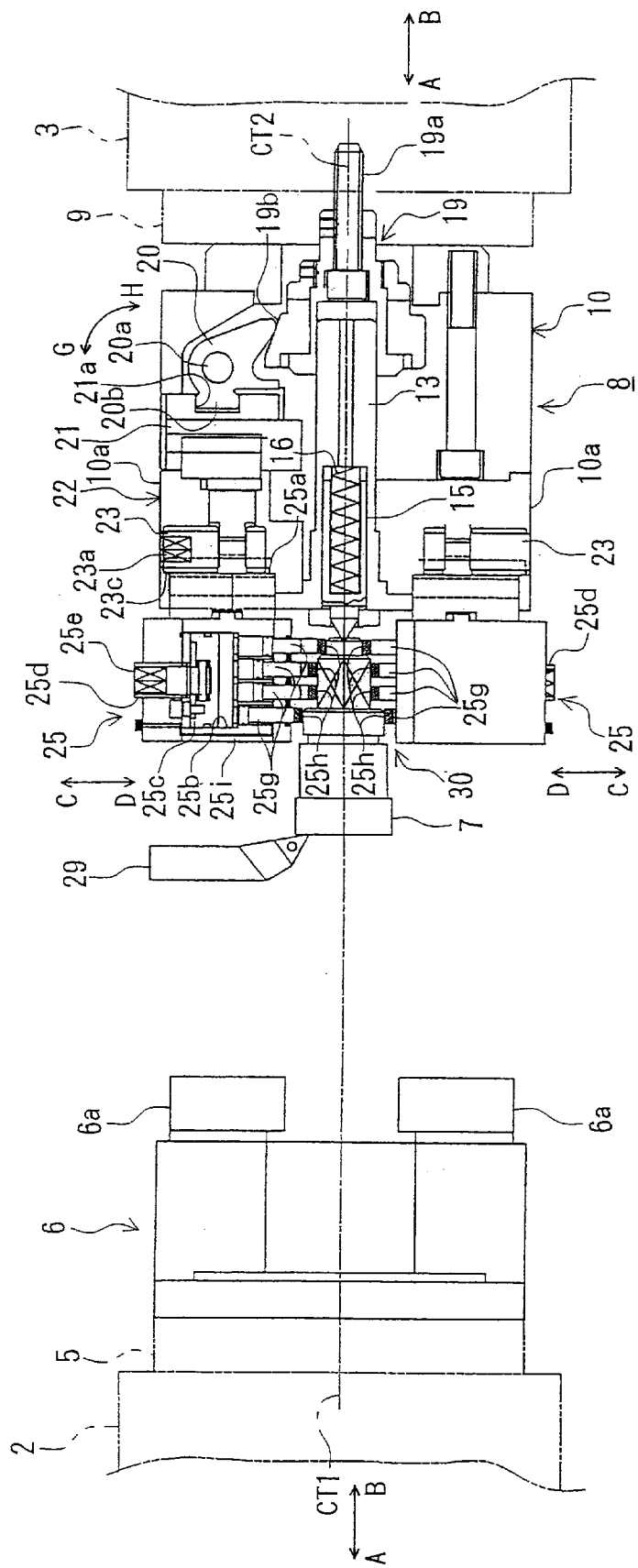
FIG. 8 is a view for showing a routine of machining on a workpiece using the chuck unit for lathe of FIG. 1.

In this state, the spindle stocks 2, 3 are relatively moved away from each other, as shown in FIG. 8. The cutting tool 29 or another such tool, such as a milling tool, a fraise tool, or a drilling tool, is installed on the tool rest 26 in place of the chuck jaw operation jig 27. A second routine of machining can be executed on the pre-machined portion of the left half of the figure on the workpiece 7 in such a manner that the spindle 9 is driven and rotated at a predetermined rotational speed or number of revolutions, and/or is positioned at a predetermined rotational angle position so as to hold the workpiece 7 according to the program of machining operations. The second routine of machining can be smoothly executed since the workpiece 7 is securely held in position by the third jaws 25 through the portion on which the first routine of machining finishes, as already mentioned.

Figure 9:
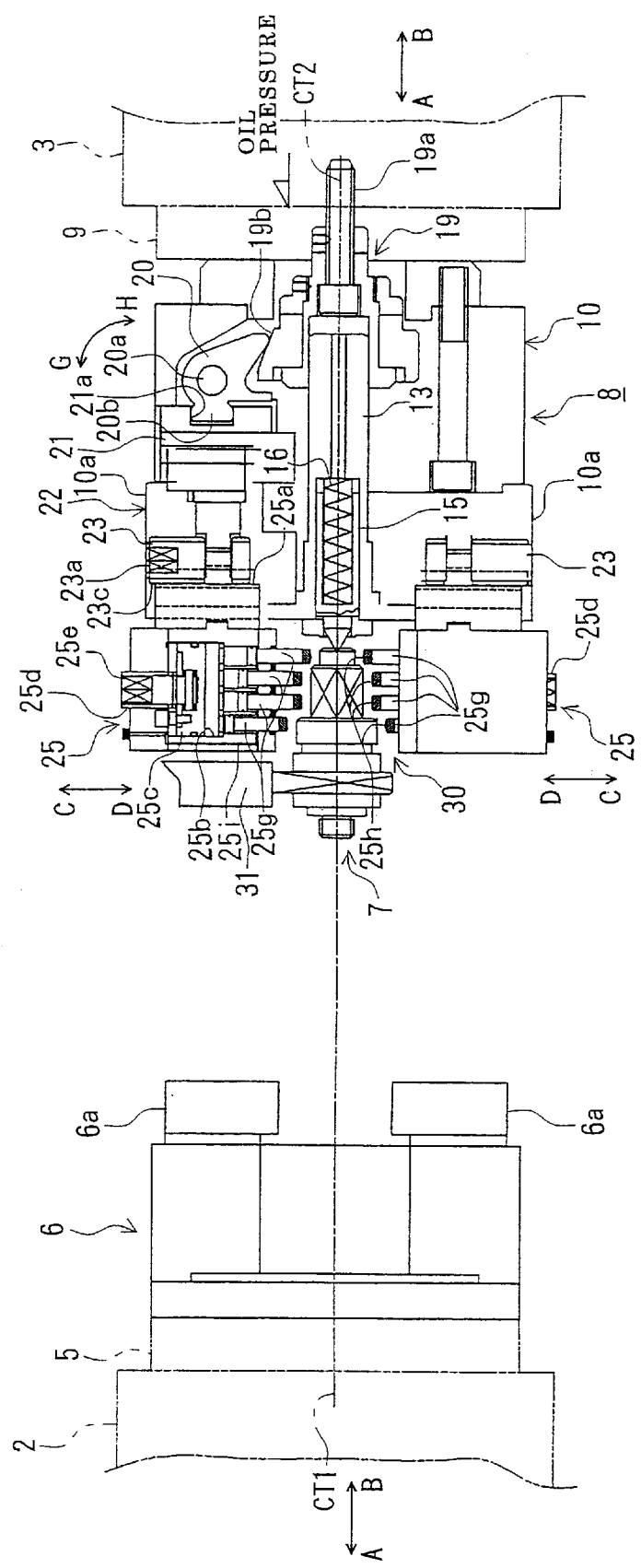
FIG. 9 is a view for showing a routine of machining on a workpiece using the chuck unit for lathe of FIG. 1.

After finishing the second routine of machining on the workpiece 7, the workpiece 7, held by the chuck unit 8, is engaged by a handling robot 31, shown in FIG. 9. In this state, the bar 19a of the base 19 is pressed in the direction as shown by the arrow A by a hydraulic actuator (not shown).

Then, the cam 20 engaging with the engagement face 19b of the base 19 oscillates in the direction shown by arrow H through the axis 20a. At the same time, the three first jaws 21 synchronously move in the direction as shown by the arrow C, that is, in a radial direction relative to axial center CT2, and in particular radially away from the axial center CT2, by action of the engagement portion 20b and the channel 21a. Then, the second jaws 22 and the third jaw 25 installed on the first jaw 21 also move in the direction as shown by the arrow C in a similar way, and the workpiece holding portions 25h, which have been engaged against the workpiece 7 with a predetermined holding pressure, also move in the direction as shown by the arrow C.

Figure 10:
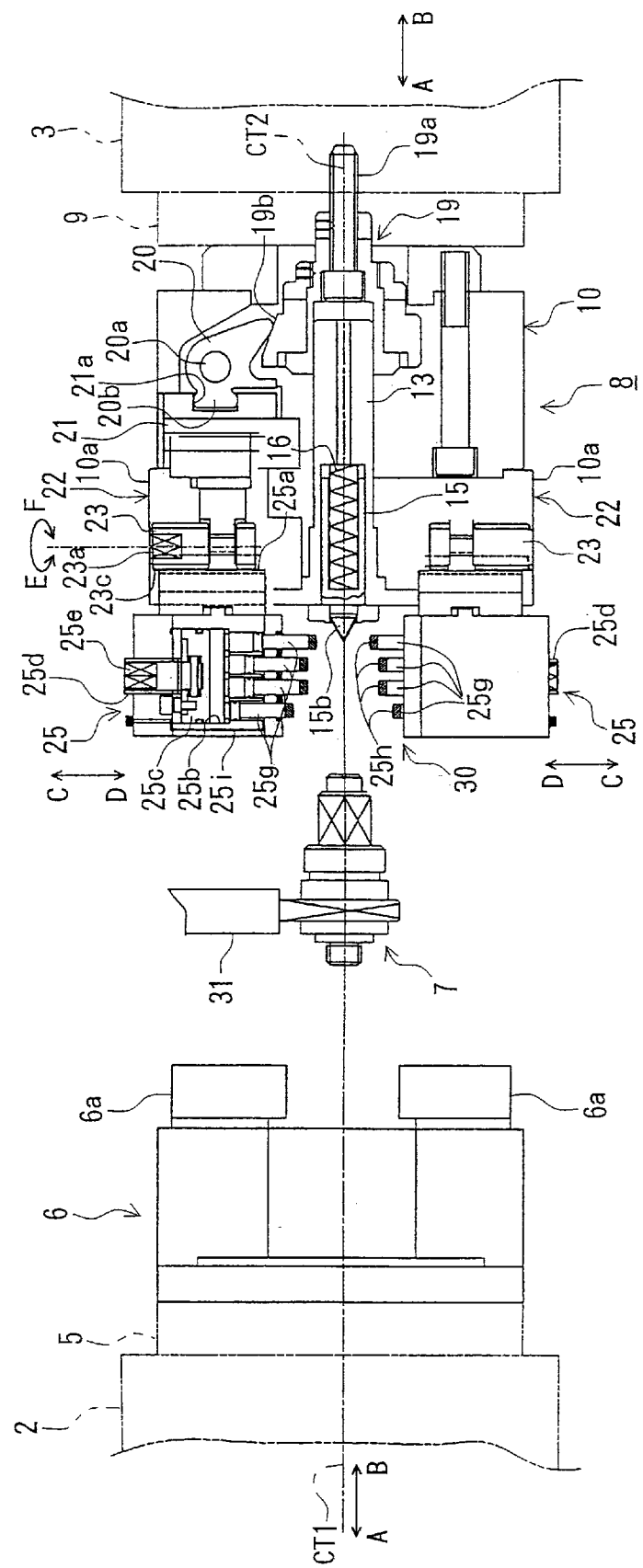
FIG. 10 is a view for showing a routine of machining on a workpiece using the chuck unit for lathe of FIG. 1.

By these steps, the contact and engagement between the piston rod 25g and the outer peripheral portion of the workpiece 7 is also released, and the workpiece 7 is held by the handling robot 31. Then, the machined workpiece 7 is taken out from the workpiece holding space 30 of the chuck unit 8 by relatively moving the handling robot 31 in the direction as shown by the arrow A with respect to the spindle stock 3, as shown in FIG. 10.

In some situations, the workpiece 7 cannot be pulled out in the direction shown by the arrow A due to interference between the piston rods 25g and the outer peripheral portion of the workpiece 7, with only an unclamping operation of the first jaw 21 by the base 19. This occurs due to the shape of the workpiece 7. The chuck jaw operation jig 27 is installed on the tool rest 26. The adjusting screws 23 of the three second jaws 22 are respectively rotated in the direction as shown by the arrow E so as to move the third jaws 25 in the direction as shown by the arrow C, and the workpiece holding portions 25h of the piston rods 25g are retracted to positions where they do not interfere with the outer peripheral portion of the workpiece 7. The workpiece 7 can then be pulled out in the direction as shown by the arrow A. The machined workpiece 7 is carried to a proper parts catcher or the like that is outside the machine shown.

When the machined workpiece 7 is taken out from the chuck unit 8 in this way and the third jaws 25 are not opened in the direction as shown by the arrow C, the adjusting screws 23 of the second jaws 22 are rotated by the chuck jaw operation jig 27 as mentioned before so as to drive and open the third jaws 25 in the direction as shown by the arrow C. Subsequently, the operation rod 25d of the third jaw 25 is driven and rotated in the direction as shown by the arrow E so as to move the piston 25c in the direction as shown by the arrow C, that is, in a direction away from the axial center CT2.

Figure 11:
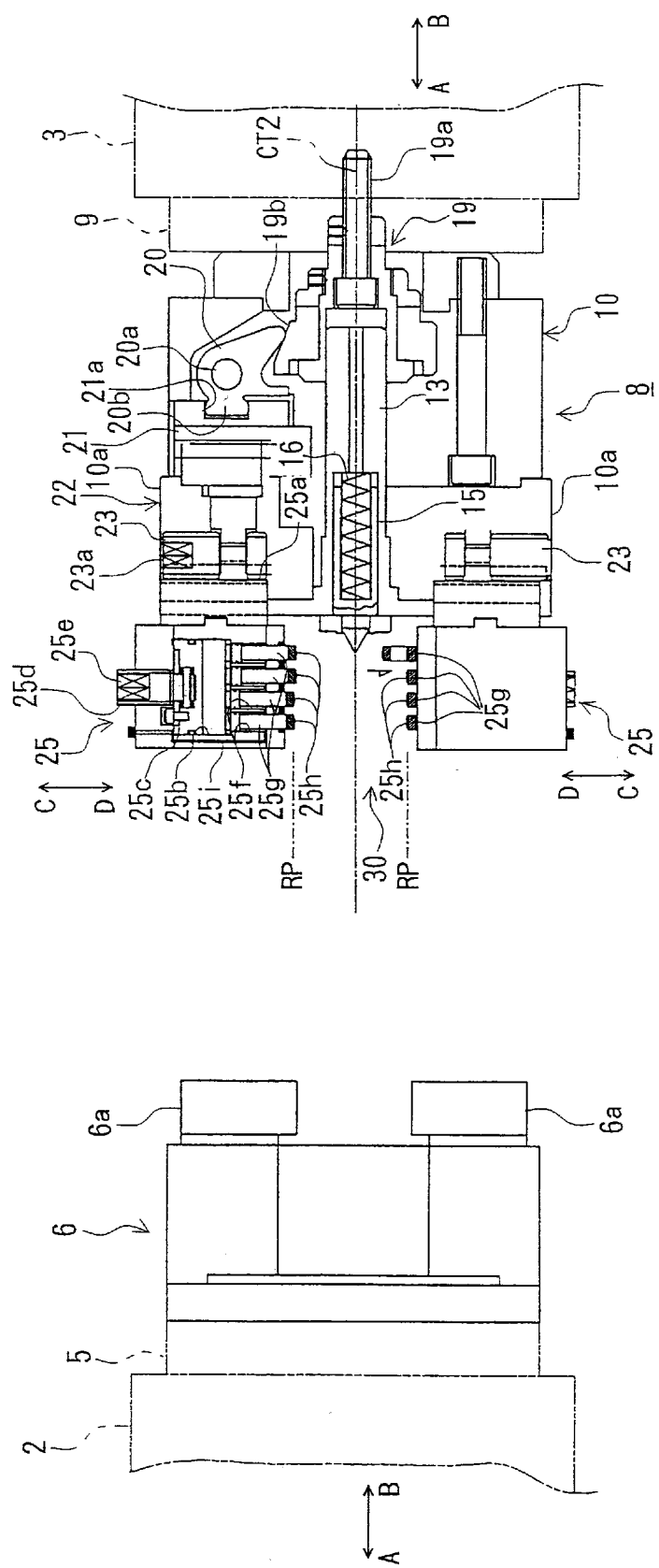
FIG. 11 is a view for showing a routine of machining on a workpiece using the chuck unit for lathe of FIG. 1.

Then, each piston rod 25g in the sub-cylinder 25f is moved in the direction shown by arrow C, that is, in the direction away from the axial center CT2, so as to store at a retracted position RP, shown in FIG. 11. By doing so, the workpiece holding portion 25h is also retracted in the direction shown by arrow C so as to widely open the workpiece holding space 30 at the periphery of the axial center CT2.

When the piston rods 25g are not sufficiently moved to the retracted position in the direction as shown by the arrow C only with the movement of the piston 25c in the direction as shown by the arrow C, the piston rods 25g can be positively moved in the direction shown by arrow C, by supplying the lower portion of each sub-cylinder 25f (on the axial center CT2 side) with compressed air via a proper working fluid supply means, such as an air supply path 25i having its opening near the adjusting hole 25e of the operation rod 25d at the outer peripheral portion of each third jaw 25.

In an another method, each piston rod 25g may be stored in the sub-cylinder 25f in such a manner that when spindle 9 is rotated at an intermediate speed, centrifugal force moves each piston rod 25g in the direction shown by arrow C.

The second jaw 22 and the adjusting screw 23 are not needed when the stroke of the third jaw 25 in the axial center CT2 direction can be sufficiently secured. And, in another structure, the third jaw 25 may be synchronously moved in the direction as shown by the arrows C and D directly by the first jaw 21.

Figure 20:
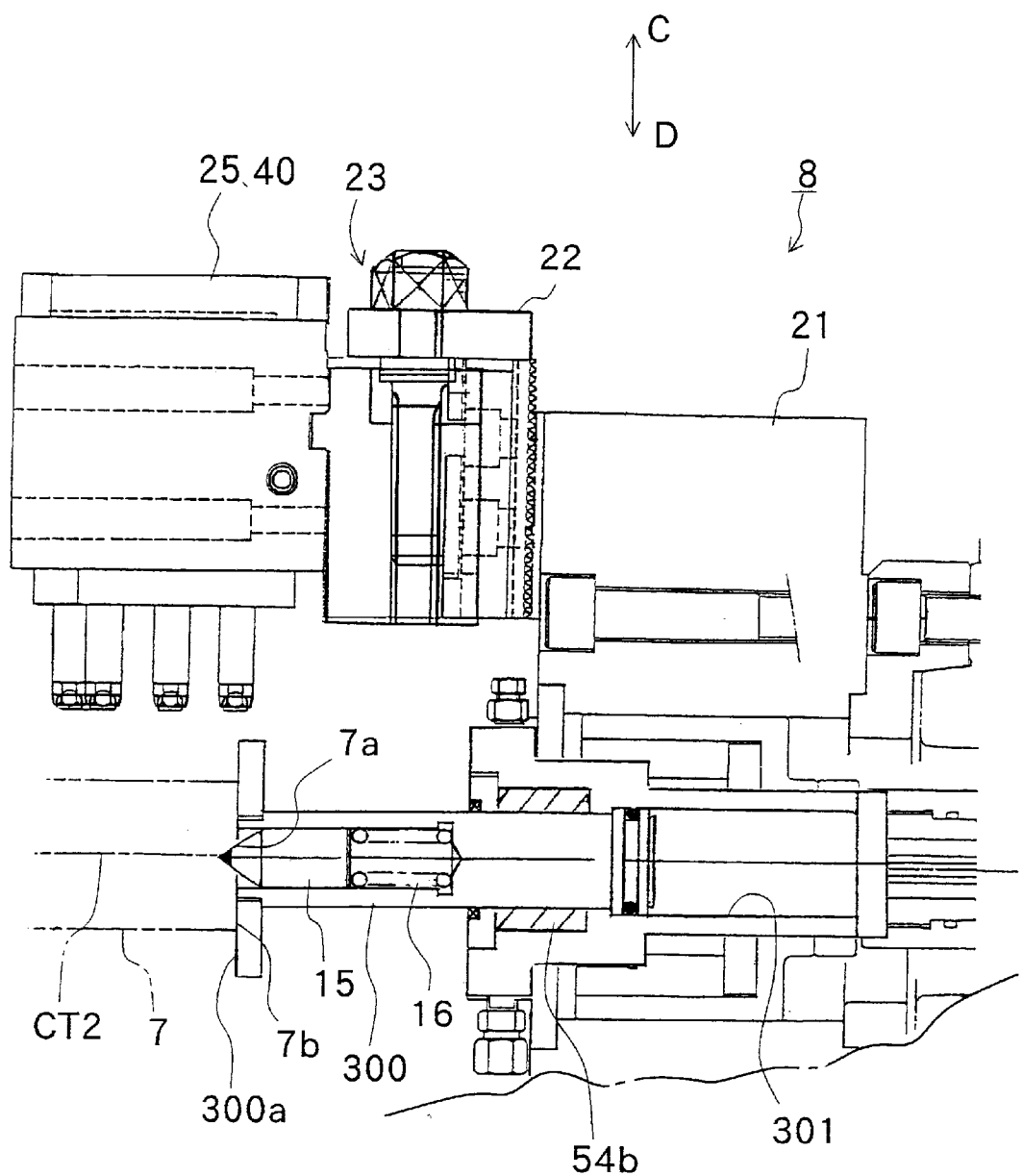
FIG. 20 is a semi-sectional view for showing a forth embodiment of the chuck unit for lathe applying the present invention.

Another structure of the first jaw 21, the second jaw 22 and the third jaw 25 is possible. That is, the first jaw 21 and the second jaw 22 may be united with each other as a sliding member, and the adjusting screw 23 may be provided on the first jaw 21 so as to directly drive and move the third jaw 25 in the direction as shown by the arrows C and D by the adjusting screw 23. Furthermore, the second jaw 22 and the third jaw 25 may be unitedly provided with each other as the workpiece holding member, as shown in FIG. 20, and the adjusting screw 23 may be provided at the workpiece holding member so as to directly move and drive the workpiece holding member in the direction as shown by the arrows C and D with respect to the first jaw 21.

The number of workpiece holding members on main body 11, such as the third jaws 25, and the number of sliding members, such as the first jaws 21, for driving, opening and closing the workpiece holding member, is not necessarily three. Two, or four or more can be provided.

Besides, the number of the workpiece holding rods 25g installed on each workpiece holding member, such as the piston rods 25g, need not always be four in a line concerning each third jaw 25. The workpiece holding rods 25g preferably have a plurality of lines and a plural number on each line. The workpiece holding rods 25g also may have a plurality of lines, located in a right angle direction with respect to the plane of the paper in FIG. 1 concerning each third jaw 25.

The energizing means for moving the workpiece holding rod 25g to the retracted position RP, i.e., retracted in the direction shown by arrow C with respect to the axial center CT2, need not always be the air supply path 25i. Fore example, a coil spring may be provided, being normally contracted and elastically urging the workpiece holding rod 25g in the direction shown by arrow C.

Figure 12:
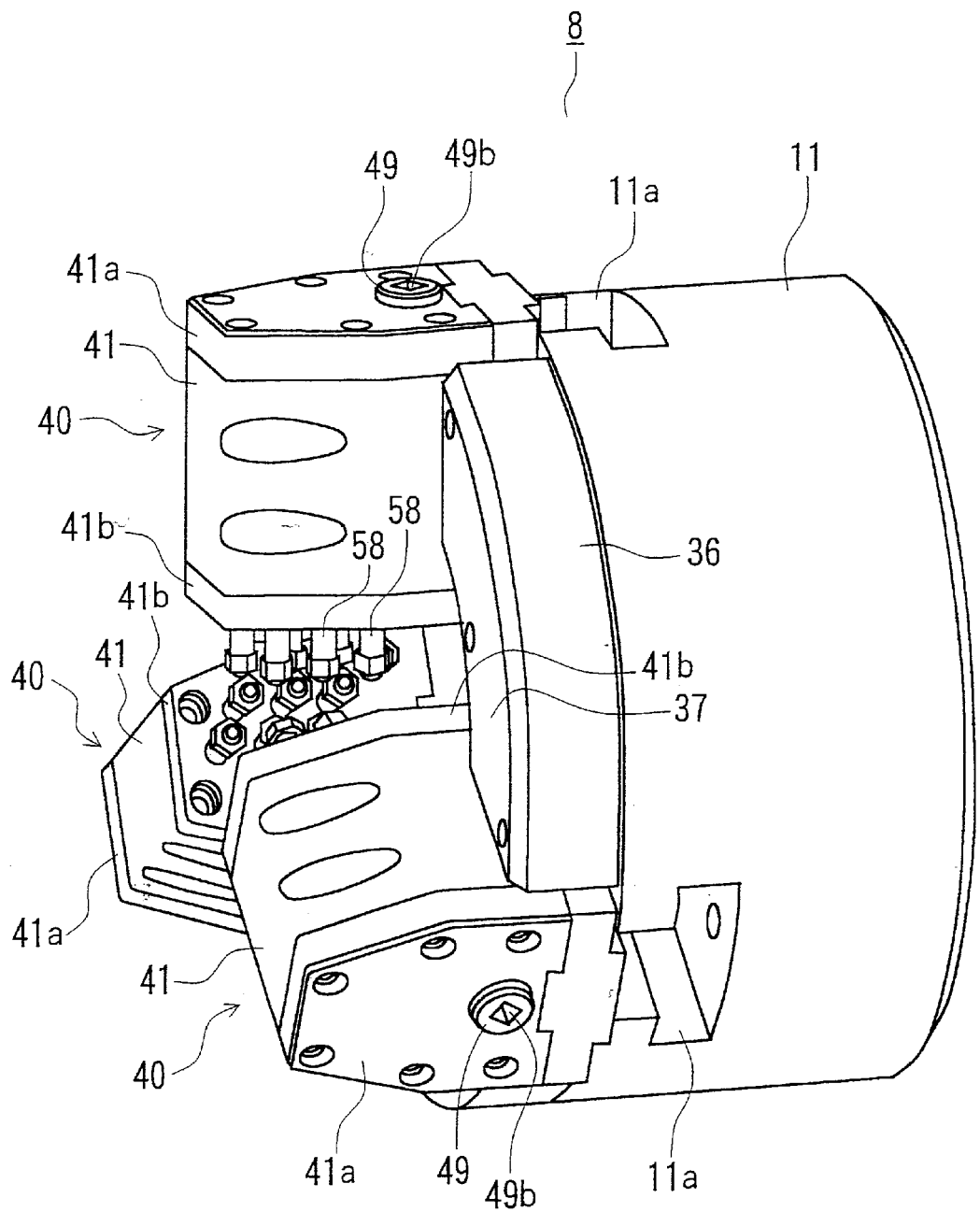
FIG. 12 is a perspective view showing a second embodiment of the chuck unit for a lathe, applying the present invention.

FIGS. 12 through 17 show the second embodiment of the chuck for machine tools according to the invention. FIG. 12 is a perspective view showing a second embodiment of the chuck unit for lathe, applying the invention. FIG. 13 is a front elevation of the chuck unit for lathe as shown in FIG. 12. FIGS. 14 through 17 are views for explaining motions of the chuck unit for lathe of FIG. 12.

The chuck unit 8 in this embodiment has the structure that a fourth jaw corresponding to the third jaw 25 is attached to the first jaw 21 in the above-mentioned embodiment. Similar to the above-mentioned embodiment, this chuck unit 8 is attached to the spindle 9. Therefore, the explanation inside the chuck unit is omitted, and the fourth jaw will now be explained hereinafter. For this embodiment, the same reference numbers are used as in FIGS. 1 through 11.

However, the "fourth" jaw (the workpiece holding member) and the "first" jaw (the sliding member) can refer to a different part as shown in this other embodiment. That is, the structure may be such that the workpiece holding member that is the second jaw or the fourth jaw also serves as the first jaw which is the sliding member.

As shown in FIGS. 12 and 13, the chuck unit 8 has a cylindrical main body 11. On the front face of this main body 11, three T channels 11a are formed at 120°pitch in a radial direction relative to axial center CT2. In each T channel 11a, three sliders (not shown) corresponding to the first jaw 21 of the above-mentioned embodiment are respectively slidably supported along the T channel 11a.

A fourth jaw 40 is fixed by the slider, and is provided free to move in the radial direction along the T channel 11a. On the front face of the main body 11, three pits 36 are fixed, and each pit 36 is positioned between the respective fourth jaws 40, and a U shaped channel formed at each pit 36. A cover 37 is attachable for covering an opening portion of the channel.

In the channel of each pit 36, two pipes are arranged for air pressure (not shown) and a pipe is arranged for oil pressure (not shown). These can be respectively formed by flexible tubes that connect adjacent fourth jaws 40. That is, the three fourth jaws 40 are respectively connected to one another by the two arranged pipes for air pressure and one for oil pressure. When any one of the fourth jaws 40 is operated, other two fourth jaws 40 also operate. Flexible pipes made of metal or a hose made of synthetic resin may be used for the arranged pipes for air pressure and oil pressure.

Figure 14:
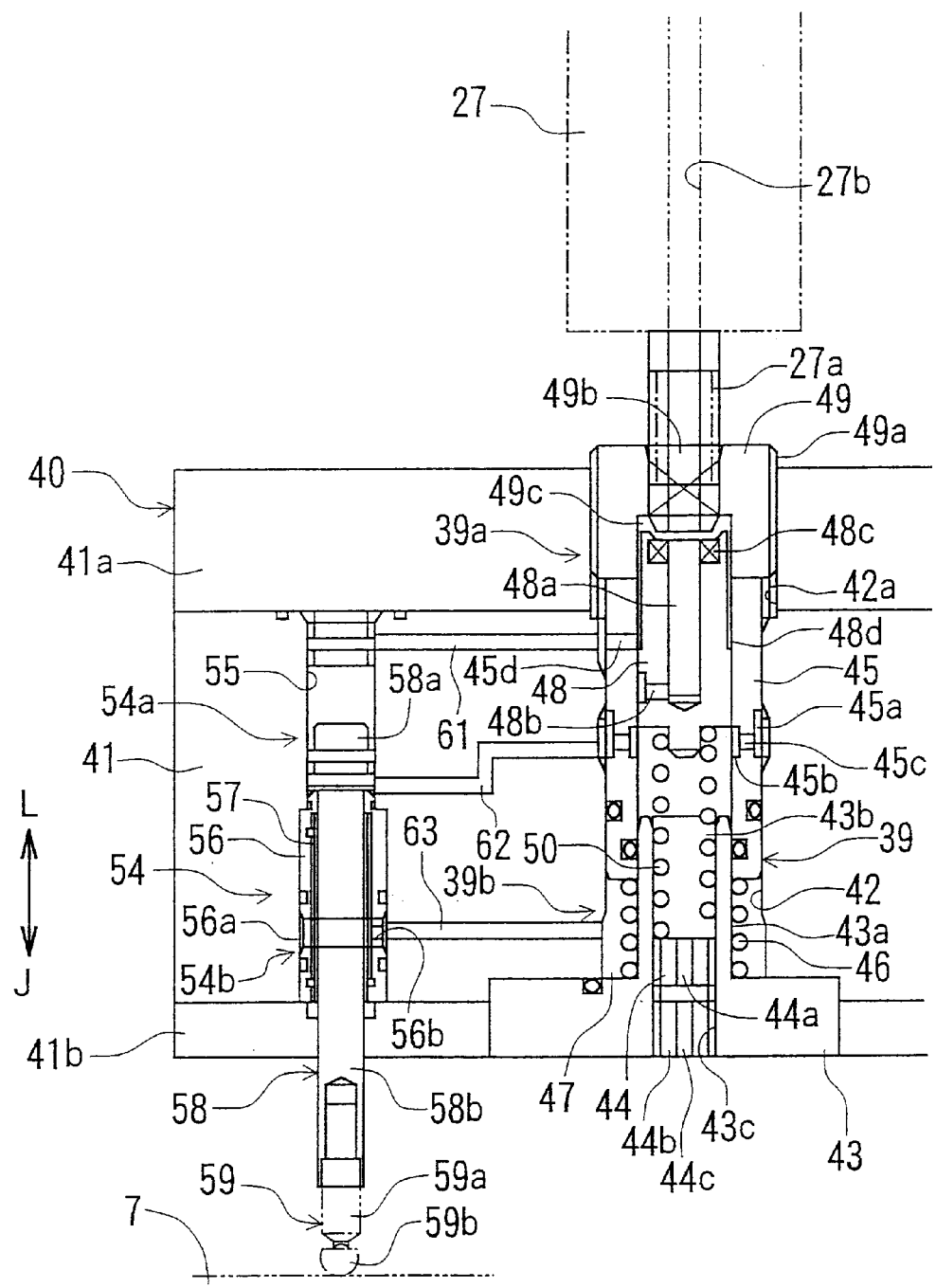
FIG. 14 is an explanation view for showing motions of the chuck unit for lathe of FIG. 12.

As shown in FIG. 14, the forth jaw 40 has an operation portion 39 and a workpiece holding portion 54. In FIG. 14, a single operation portion 39 and a single workpiece holding portion 54 are shown for the convenience of illustration. In fact, all of the workpiece holding portions 54 located at the chuck unit 8 are operated by the single operation portion 39 through the arranged pipes for air pressure and oil pressure.

The fourth jaw 40 has a main body 41 and a pair of face plates 41a, 41b fixed by both ends of the main body 41. A through hole 42 is formed in the main body 41 and the face plates 41a, 41b, and the end portion of the face plate 41a has a screw hole 42a. The operation portion 39 is located in this through hole 42.

A seat 43 is fixed on the face plate 41b side of the through hole 42, and has a projection 43a to be inserted into the through hole 42. A through hole 43b is formed at this projection 43a, passing through in its axial direction. The end portion of the face plate 41b side of this through hole 43b is a screw hole 43c. An adjusting screw 44 is fitted in this screw hole 43c.

A through hole 44a is formed at the axial center of adjusting screw 44, and a screw 44b for back up is located at the adjusting screw 44. Also at this screw 44, a through hole 44c is formed at an axial center communicating with the through hole 44a. And, the through hole 44a and the through hole 44c form an air exit.

Piston 45 has a cylindrical shape. Its outer peripheral face is fitted and slides in the through hole 42. Its inner peripheral face is fitted and slides on the projection 43b. This piston 45 is supported by a coil spring 46 installed on the outer periphery of the projection 43a. At the center portion of this piston 45, channels 45a, 45b in a ring shape are formed on the outer peripheral face and inner peripheral face, and a plurality of through holes 45c dare formed for connecting these channels 45a and 45b. Besides, a through hole 45d is formed on the face plate 41a side of the piston 45 as a passage of compressed air.

An oil chamber 47 has a space enclosed by the inner peripheral face of the through hole 42, the outer peripheral face of the projection 43b, the end face of the main body 41 side of the seat 43 and the end face of the face plate 41b side of the piston 45. This chamber is filled with oil. The piston 45 comprises an oil pressure generating means 39b for generating oil pressure by changing the capacity of the oil chamber 47 when piston 45 is moved.

A spool 48 is fitted in the piston 45, is free to slide, and is supported by a coil spring 50 installed in the through hole 43b of the projection 43a. The position of this coil spring 50 is adjustable in the direction of the axis of the piston 45 by the adjusting screw 44, and the coil spring 50 always urge the spool 48 in the direction as shown by the arrow L.

A hole 48a is formed at the axial center of this spool 48 as a passage of compressed air. And, a through hole 48b is formed for communicating one end of this hole 48a and the channel 45b of the piston 45 with each other. A ring 48c with an elastic body, such as rubber, is located on the end face of the face plate 41a on the side of the hole 48a of the spool 48. And, the outer peripheral portion of the end face of the face plate 41a at the side of the spool 48 is formed with a smaller diameter so as to provide a passage 48d for compressed air, communicating with the through hole 45d between the outer peripheral portion and the piston 45. That is, the piston 45 and the spool 48 define a passage for switching means 39a and carry compressed air.

A screw 49a is formed at the outer periphery of an operation rod 49, and is fitted on the screw 42a of the through hole 42. At the axial center of this operation rod 49, an operation hole 49b with a quadrangular cross-section, and a hole 49c with a circular cross-section, communicate with each other, penetrating in the axial direction of rod 49. The operation rod 49 is fitted outside the spool 48 so as to form a passage 48d between the hole 49c of the rod 49 and the outer peripheral face of the face plate 41 a side of the spool 48. And, the end face of the main body 41 side of the operation rod 49 abuts on the end face of the face plate 41a side of the piston 45 by the pressure of coil spring 46.

A through hole 55 is formed, penetrating the main body 41 and the face plate 41b. The workpiece holding portion 54 is located in this through hole 55.

A sleeve 56 is installed on the face plate 41b side of the through hole 55. A channel 56a in a ring shape is formed at the outer peripheral face of the sleeve 56, and a through hole 56b is formed, connecting this channel 56a with the inner peripheral face of the sleeve 56. A damper 57 in a cylindrical shape is formed of thin metal, capable of being elastically deformed in its diameter direction, and is located at the inside of the sleeve 56 so as to form a predetermined clearance between the damper 57 and the inner peripheral face of the sleeve 56.

A piston rod 58 with a piston 58a slideably fits in the through hole 55 and a rod 58b slideably fits in the damper 57. The through hole 55 and the piston rod 58 comprise a driving means (air cylinder) 54a. At the end portion of the face plate 41b side of the piston rod 58, a rod 59a is provided so as to comprise a workpiece holding rod 59. At the top end of this rod 59a, a pad 59b (shown in FIG. 14) is supported through a universal joint (not shown) so as to oscillate. The workpiece 7 is held by contact with this pad 59b.

The end portion of the face plate 41a side of the through hole 55 is connected with the through hole 45d of the piston 45 through a communicating hole 61 formed at the main body 41. The central portion of the through hole 55 is connected with the channel 45a of the piston 45 through a communicating hole 62 formed at main body 41.

The channel 56a of the sleeve 56 and the oil chamber 47 are connected by a communicating hole 63 formed at the main body 41. The damper 57 is elastically deformed in its diameter direction by the oil pressure supplied from the oil chamber 47, and the rod 58b of the piston rod 58 is restricted and fixed. Thus, the sleeve 56 and the oil chamber 47 et al. comprise a fixing means 54b for fixing the position of the rod 58b.

The chuck jaw operation jig 27 to be used in this embodiment defines a supply hole for compressed air at its axial center. Compressed air is supplied from the top end of its operation portion 27a.

The routine of holding the workpiece 7 in the chuck unit 8 will now be explained, referring to the above-mentioned embodiment. The third jaw 25 of the previous embodiment corresponds with the fourth jaw 40 in the present embodiment.

As shown in FIG. 1 for the above-mentioned embodiment, the workpiece holding space 30 (see FIG. 13) formed by the workpiece holding portion 59 is set in the widest open state at which the fourth jaws 40 are moved in the radial direction with respect to the axial center CT2. That is, the workpiece holding portions 59 are wide open with respect to the axial center CT2. The top end of the workpiece 7 is inserted into workpiece holding space 30 after finishing the first routine of machining.

When the top end of the workpiece 7 is inserted into the workpiece holding space 30, the center part 15 is fitted in the center hole 7a of the workpiece 7, as shown in FIG. 1, and the workpiece is correctly supported by the chuck 6 of the spindle 5 side and the center 15, corresponding the axial center of the workpiece 7 and the axial center CT2 with each other.

The bar 19a of the base 19 is pulled in through a hydraulic actuator (not shown) in the direction as shown by the arrow B, as shown in FIG. 6 of the above-mentioned embodiment. Then, the cam 20 engaging with the engagement face 19b of the base 19 oscillates in the direction as shown by the arrow G through the axis 20a and together with this movement, three first jaws 21 are synchronously moved in the direction as shown by the arrow D, that is, in the axial center CT2 direction through the engagement portion 20b and the channel 21a.

The fourth jaw 40, connected with the first jaw 21 through the slider, is also moved in the axial center CT2 direction in a similar way. That is, the fourth jaw 40 is moved toward the workpiece 7. At this time, the pad 59b of the workpiece holding portion 59 is not yet in contact with the workpiece 7.

Subsequently, the chuck jaw operation jig 27 is installed on the tool rest 26, as shown in FIG. 5 of the above-mentioned embodiment. In this state, the tool rest is moved and driven so as to insert the operation portion 27a of the top end of the chuck jaw operation jig 27 in the operation hole 49b of the operation rod 49, as shown in FIG. 14.

Compressed air is supplied from the top end of the operation portion 27a of the chuck jaw operation jig 27 through a through hole 27b formed at the chuck jaw operation jig 27 for the spool 48. The spool 48 is moved in the direction as shown by an arrow J by the compressed air, against the elasticity of the coil spring 50. The through hole 45d, which has been closed by the spool 48, communicates with the passage 48d formed at a clearance of the outer peripheral face of the spool 48, as shown in FIG. 14. Then, the compressed air supplied between the operation rod 49 and the spool 48 is supplied to an upper portion of the through hole 55 of the workpiece holding portion 54, passing between the inner peripheral face of the hole 49c of the operation rod 49 and outer peripheral face of the spool 48, in a passage 48d formed between the inner peripheral face of the piston 45 and the outer peripheral face of the spool 48, and along the through hole 45d of the piston 45 and the communicating hole 61.

The compressed air supplied from the chuck jaw operation jig 27 is also supplied to other fourth jaws 40 coupled through the arranged pipe for air pressure, in pit 36 (see FIGS. 12, 13). Each of the fourth jaws 40 is supplied.

The quantity of compressed air needed to be supplied from the chuck jaw operation jig 27 is that quantity needed for movement, plus a quantity ejected to the atmosphere through communicating passage 61, the clearance formed between the inner peripheral face of the through hole 42 and the outer peripheral face of the piston 45, and the clearance formed between the screw 42a and the screw 49a. This quantity corresponds to displacement of the workpiece holding portions 54 located at the chuck unit 8, or slightly more. The spool 48 of the other fourth jaw 40 is urged in the direction shown by arrow L in FIG. 14, by the elasticity of coil spring 50. The outer peripheral face of spool 48 closes the through hole 45d. So, compressed air does not leak even if the compressed air is supplied through the arranged pipe from the fourth jaw 40 connected with the operation jig 27, and is effectively used for moving the piston rod 58 in the direction shown by arrow J.

The piston rod 58 projects due to air pressure, in the direction shown by arrow J for the workpiece 7, from the fourth jaw 40, as shown in FIG. 14, until the pad 59b abuts against the workpiece 7. Each workpiece holding portion 59 stops moving when the pad 59b of its top end abuts on the outer peripheral face of the workpiece 7. The contact pressure between the pad 59b and the workpiece 7 is not raised initially, while the compressed air is consumed by moving the workpiece holding portion 59. The pressure can increase after the holding portion 59 is stopped by contact with the workpiece 7.

At this time, the air on the face plate 41b side of the piston 58 of the workpiece holding portion 54 flows inside the piston 45 through the communicating hole 62, the channel 45a of the piston 45, the through hole 45c and the channel 45b. The air is furthermore released to the open air through the through hole 43b of the seat 43, the through hole 44a of the adjusting screw 44 and the hole 44c of the screw 44b.

When the pads 59b of all of the workpiece holding portions 59 abut against the outer peripheral face of the workpiece 7, the pressure of the compressed air supplied in the through hole 55 can increase, with resulting increase in the pressure applied between contacting pad 59b and the workpiece 7. The compressed air is supplied through all the through holes 55, such that the increase in pressure is almost equal. In this way, the workpiece 7 is securely held by the workpiece holding portions 59, that is, by the fourth jaws 40, with the workpiece axial center corresponding to axial center CT2 and with almost equal pressure applied by the workpiece holding portions 59 to the workpiece outer peripheral face. The contact pressure of the workpiece holding portions 59 against the workpiece 7 is determined by the pressure of the compressed air supplied.

Figure 15:
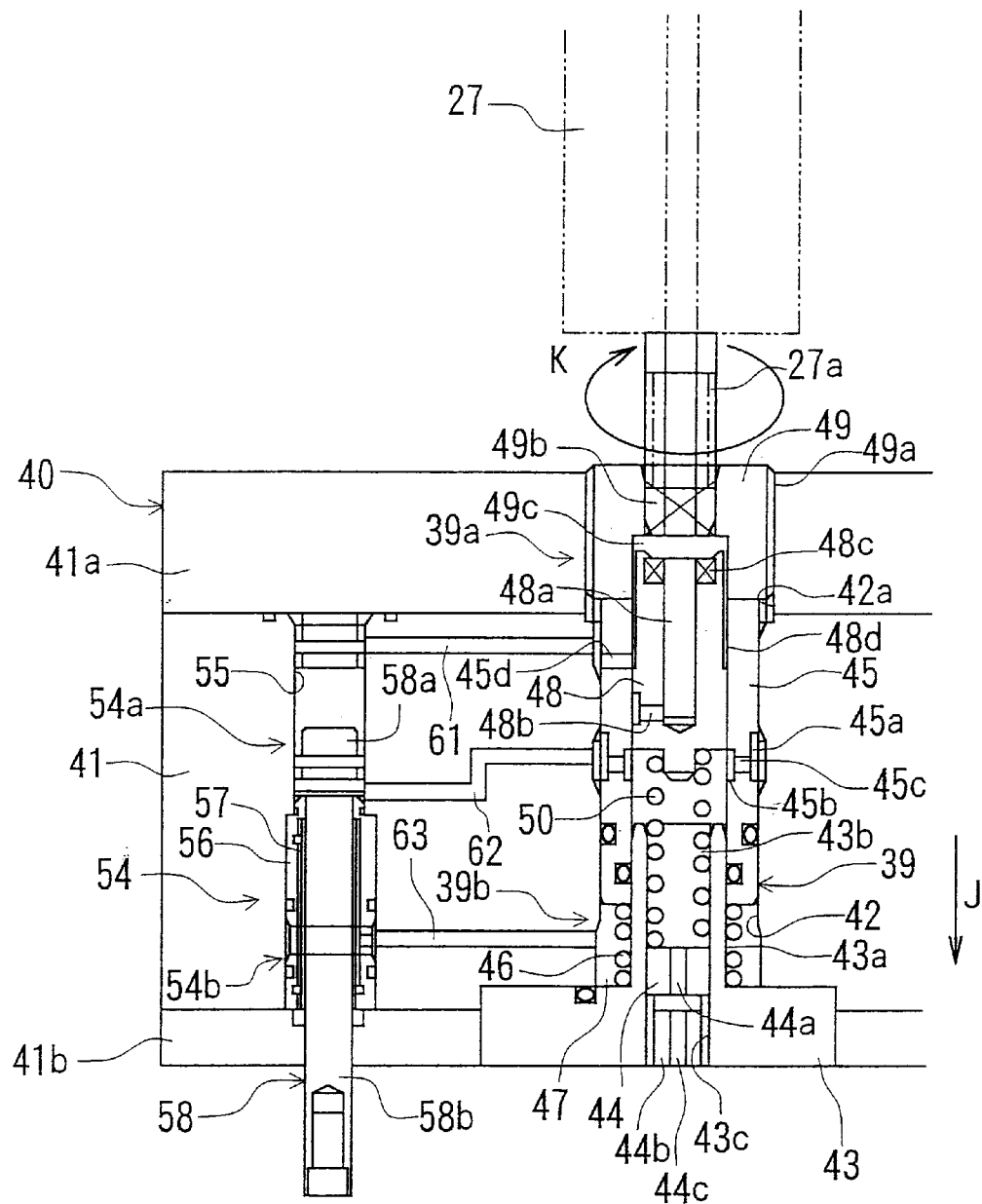
FIG. 15 is an explanation view for showing motions of the chuck unit for lathe of FIG. 12.

In this state, the chuck jaw operation jig 27 rotates in the direction shown by arrow K, rotating the operation rod 49 as shown in FIG. 15. Then, the operation rod 49, with its screw 49a fit on the screw 42a formed on the face plate 41, moves in the direction shown by arrow J, rotating in the direction shown by arrow K. By movement of this operation rod 49 in the direction as shown by the arrow J, the piston 48 is pressed, and the piston 48 is moved in the direction as shown by the arrow J, compressing the coil spring 46. Then, oil in the oil chamber 47 is moved between the sleeve 56 and the damper 57, passing through the communicating hole 63, since the oil chamber 47 also is compressed.

The oil run out from the oil chamber 47 is supplied to an adjacent other fourth jaw 40, through the pipes for oil pressure in pit 36 (see FIGS. 12, 13). The oil is supplied to the fixing portion 54b of each fourth jaw 40.

As the oil pressure rises, the damper 57 is elastically deformed in its radius direction. The damper 57 contacts rod 58b of the piston rod 58, so as to clamp the rod 58b by the contact pressure. That is, the piston rod 58 is restricted and fixed by the pressure of the oil run in between the sleeve 56 and the damper 57. By this, a plurality of workpiece holding rods 59 located at the fourth jaw 40 are fixed, three-dimensionally complementing the outer periphery of the workpiece 7.

Figure 16:
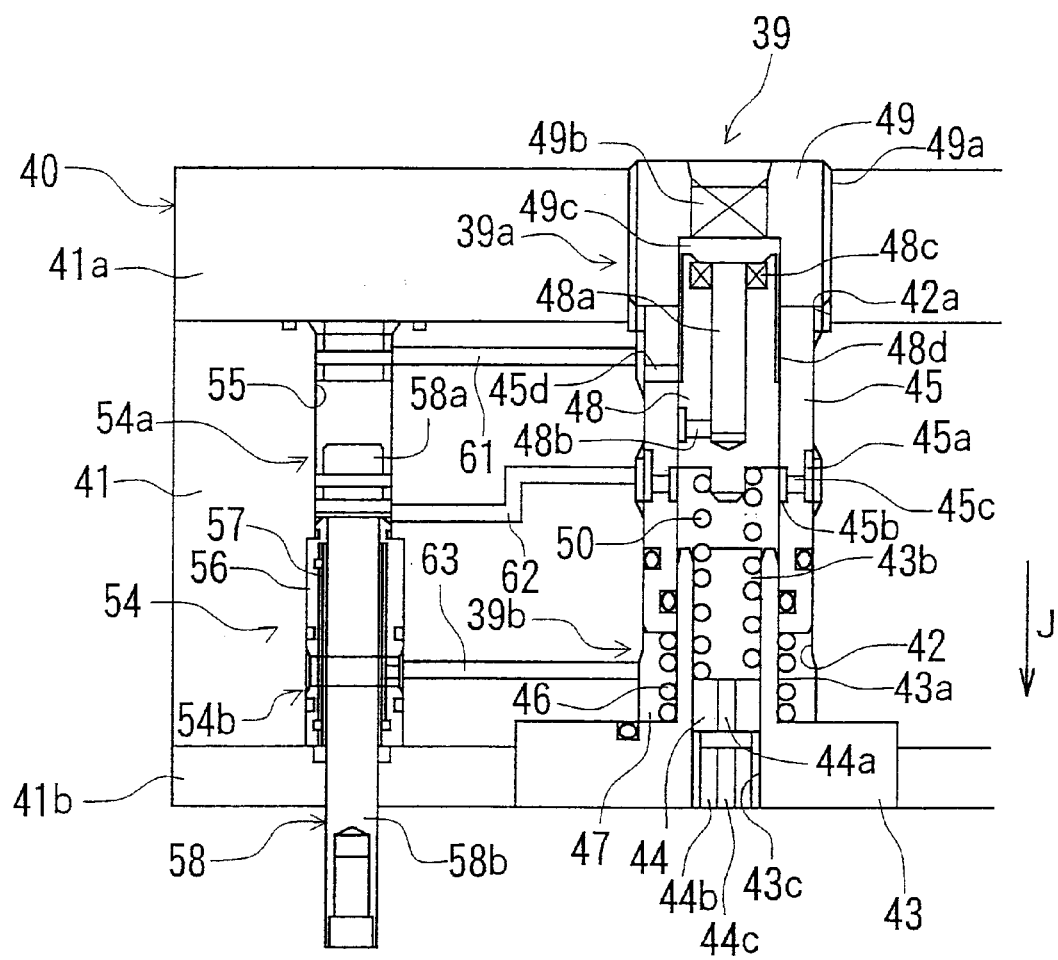
FIG. 16 is an explanation view for showing motions of the chuck unit for lathe of FIG. 12.

When the workpiece holding portions 59 are fixed, the chuck jaw operation jig 27 is retracted from the fourth jaw 40. The workpiece 7 then can be machined, as shown in FIG. 16. At this time, the piston 45 is pressed by the resisting pressure of the coil spring 46 from the operation rod 49 side. But, the position of the piston 45 is maintained and the oil pressure is maintained by the frictional force of the screw 49 fitting in the screw hole 42a. That is, the clamping force of the piston rod 58 by the damper 57 is maintained. As shown in FIG. 8 of the above-mentioned embodiment, the necessary machining is executed on the workpiece 7.

When the machining of the workpiece 7 held by the fourth jaws 40 finishes, it is held with the chuck unit 8 by the handling robot 31, as shown in FIG. 9 of the above-mentioned embodiment. The workpiece 7 is held after finishing the second routine of machining. In this state, the bar 19a of the base 19 is pressed in the direction as shown by the arrow A, through a hydraulic actuator (not shown). Then, the cam 20 engaging with the engagement face 19b of the base 19 oscillates in the direction as shown by the arrow H through the axis 20a. Together with this movement, the first jaw 21 is synchronously moved in the direction as shown by the arrow C, that is, in the radial direction relative to axial center CT2 in a direction away from the axial center CT2, through the engagement portion 20b and the channel 21a.

The fourth jaw 40, connected with the first jaw 21 through the slider, is also moved in the direction away from the axial center CT2, and the workpiece holding rod 59, which has held the workpiece 7 with a predetermined holding pressure, is also synchronously moved in a direction away from the axial center CT2 so as to release the workpiece 7. The relative position of the workpiece holding rod 59 with respect to the fourth jaw 40 is restricted by the damper 57 at this time, such that the contour of the workpiece 7 is three-dimensionally maintained. The workpiece holding space 30 can assume a new shape, formed by the workpiece holding rods 59 of each fourth jaw 40.

As a result, the workpiece 7 is being held by the handling robot 31. As shown in FIG. 10 of the above-mentioned embodiment, the machined workpiece 7 is taken out from the workpiece holding space 30 of the chuck unit 8 by relatively moving the handling robot 31 with respect to the spindle stock 3 in the direction as shown by the arrow A. The machined workpiece 7 taken out is carried to a proper parts catcher or the like outside the machine shown.

In order to repeatedly machine workpieces 7 of the same kind, the top end of the workpiece 7 after finishing the first routine of machining is inserted in the new workpiece holding space 30. The center 15 fits in the center hole 7a of the workpiece 7, and the workpiece 7 is correctly supported by the chuck 6 of the spindle 5 side and the center 15, corresponding the axial center of the workpiece 7 and the axial center CT2 with each other, in a similar way to the above-mentioned embodiment (see FIG. 1).

In this state, the bar 19a of the base 19 is pulled in through a hydraulic actuator (not shown) in the direction as shown by the arrow B, as shown in FIG. 6 of the above-mentioned embodiment. Then, the cam 20 engaging with the engagement face 19b of the base 19 oscillates in the direction as shown by the arrow G through the axis 20a. Together with this movement, three first jaws 21 are synchronously moved in the direction as shown by the arrow D, that is, in the axial center CT2 direction through the engagement portion 20b and the channel 21a.

Since the workpiece holding rods 59 have been already maintained in the shape of three-dimensional tracing the contour of the workpiece 7 at this time, all of the workpiece holding rods 59 simultaneously abut on the outer peripheral face of the workpiece 7, enclosing the workpiece 7, as it were, and contacts with the workpiece 7 with necessary pressure. Therefore, it is not necessary to make all of the workpiece holding rods 59 follow the outer peripheral face of the workpiece 7 whenever the workpiece 7 is delivered from the chuck 6 to the chuck unit 8. That is, it is sufficient to move the fourth jaw 40 in the radial direction of the axial center CT2. So, the workpiece 7 can be delivered from the chuck 6 to the chuck unit 8 in a short time.

For machining a next workpiece of a different shape or size, it is necessary to retract the workpiece holding rod 59 by retracting the piston 58a on the face plate 41a side with respect to the fourth jaw 40. The workpiece holding rod 59 is retracted as follows.

Figure 17:
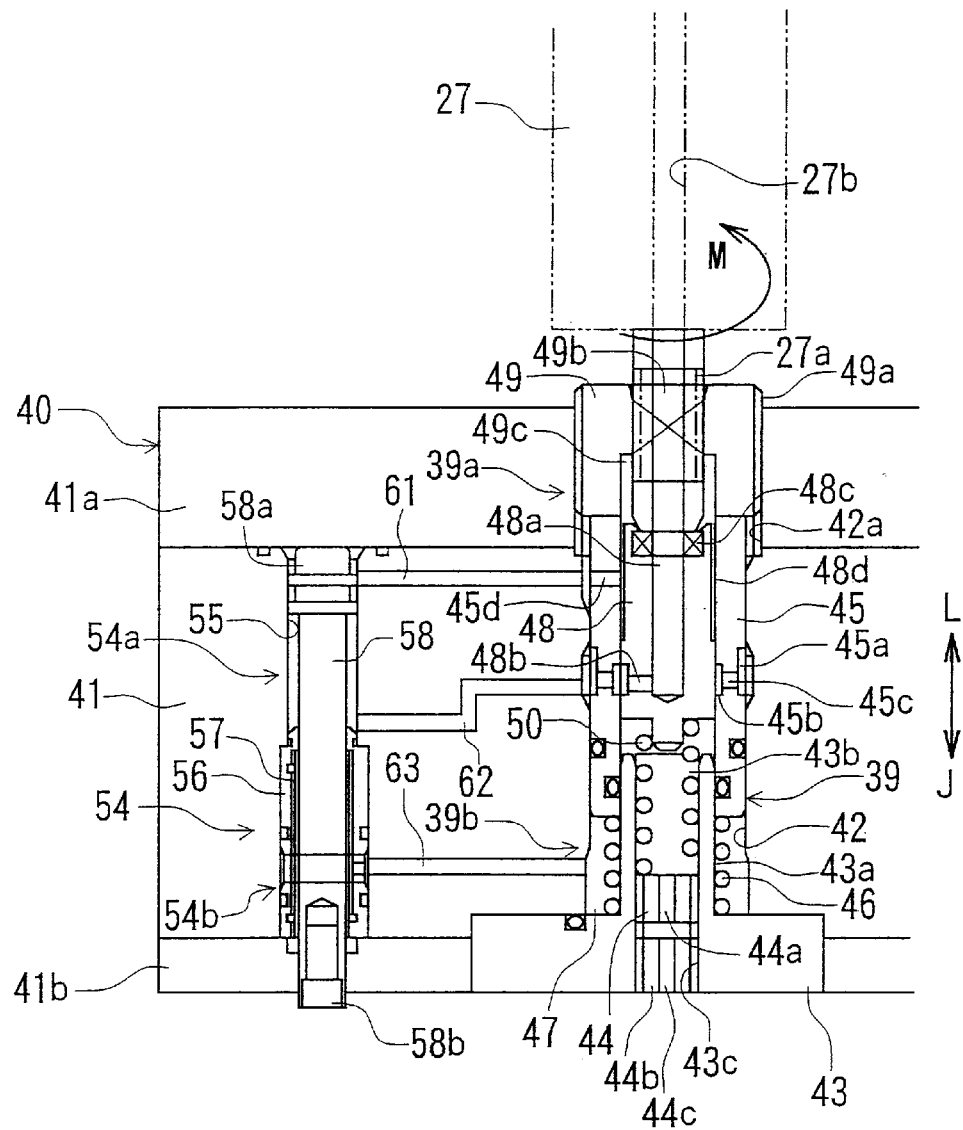
FIG. 17 is an explanation view for showing motions of the chuck unit for lathe of FIG. 12.

As shown in FIG. 17, the operation portion 27a of the top end of the chuck jaw operation jig 27 is inserted in and engaged with the operation hole 49b of the operation rod 49. At this time, the top end of the operation portion 27a is stopped at the position where the through hole 48b of the spool 48 and the channel 45a of the piston 45 communicate with each other, contacting with the ring 48c of the spool 48, and pressing the spool 48, and compressing the coil spring 50.

In this state, the chuck jaw operation jig 27 is rotated so as to rotate the operation rod 49, in the direction as shown by the arrow M. The operation rod 49 is moved in the direction shown by the arrow L. The piston 45 is also moved in the direction as shown by the arrow L together with the operation rod 49 by the resisting pressure of the coil spring 46.

The capacity of the oil chamber 47 is thus enlarged, and the oil chamber 47 is negatively pressurized. For this reason, the oil run between the sleeve 56 and the damper 57, by which the damper 57 is elastically deformed, is drawn by the negative pressure to the oil chamber 47, and is collected by the oil chamber 47 through communicating hole 63. Then, the damper 57 is restored by its elasticity so as to release the rod 58b of the piston rod 58.

The compressed air is supplied from the top end of the chuck jaw operation jig 27 through the through hole 27b. The compressed air is supplied on the face plate 41b side of the piston 58a, passing through the hole 48a of the spool 48, the through hole 48b, the channel 45b of the piston 45, the through hole 45c, the channel 45a and the communicating hole 62. By the pressure of this compressed air, the piston 58a is moved and retracted in the direction as shown by the arrow L (on the face plate 41a side), and the workpiece holding rod 59 is also retracted in the direction shown by the arrow L.

At this time, some of the air between the piston 58a and the face plate 41a is ejected into the atmosphere, passing through the communicating passage 61. A clearance is formed between the inner peripheral face of the through hole 42 and the outer peripheral face of the piston 45, and a clearance is formed between the screw 42a and the screw 49a. Another portion of air is ejected into the atmosphere through the through hole 45d of the piston 45, the passage 48d, the hole 49c, and a clearance between the operation hole 49b of the operation rod 49 and the operation portion 27a of the chuck jaw operation jig 27.

According to the present embodiment, the time for delivering the workpiece 7 from the chuck 6 to the chuck unit 8 is shortened so as to improve its working efficiency when machining is executed on the same kind of a plurality of workpieces 7, as mentioned before.

Figure 18:
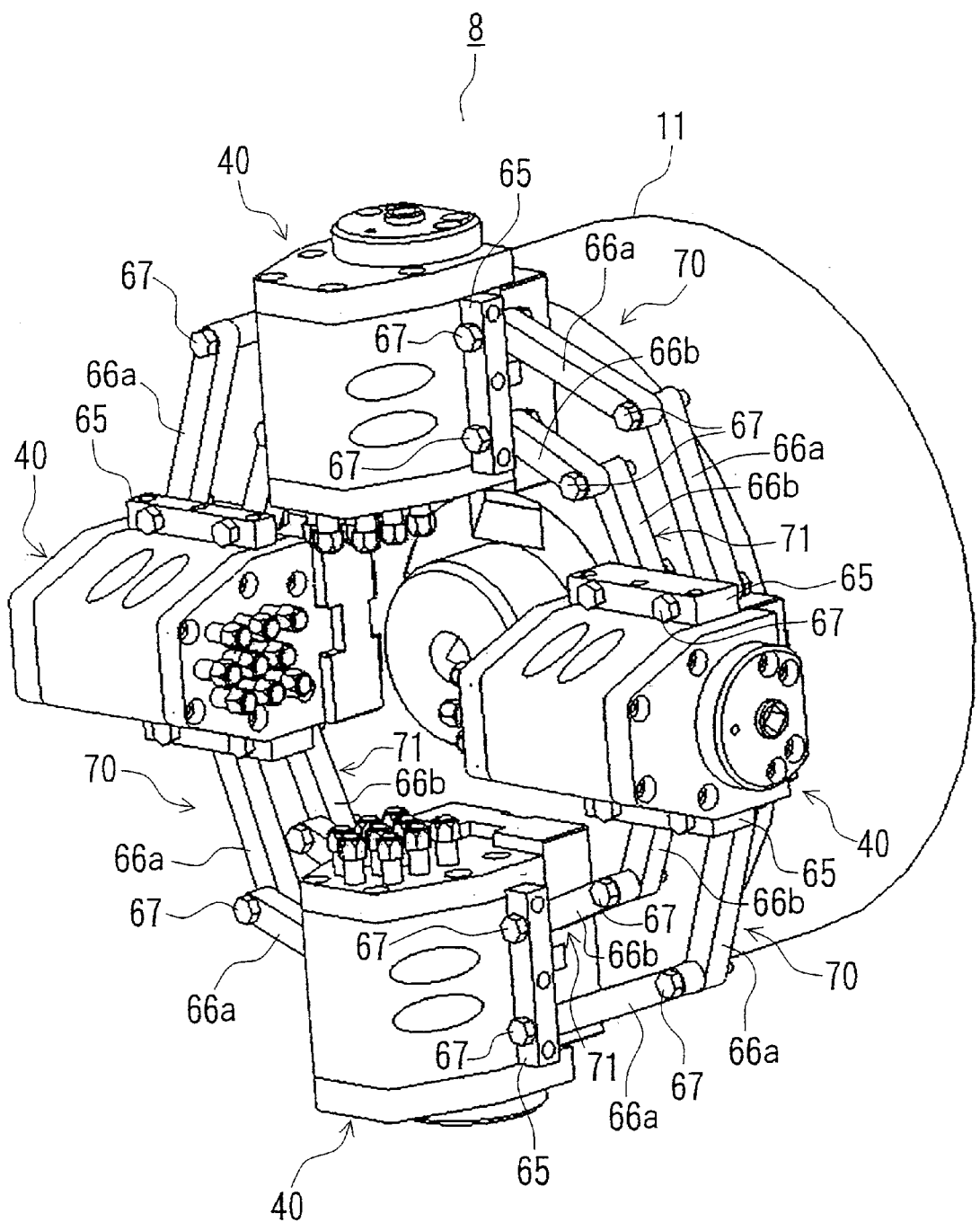
FIG. 18 is a perspective view showing a third embodiment of the chuck unit for lathe applying the present invention.
Figure 19:
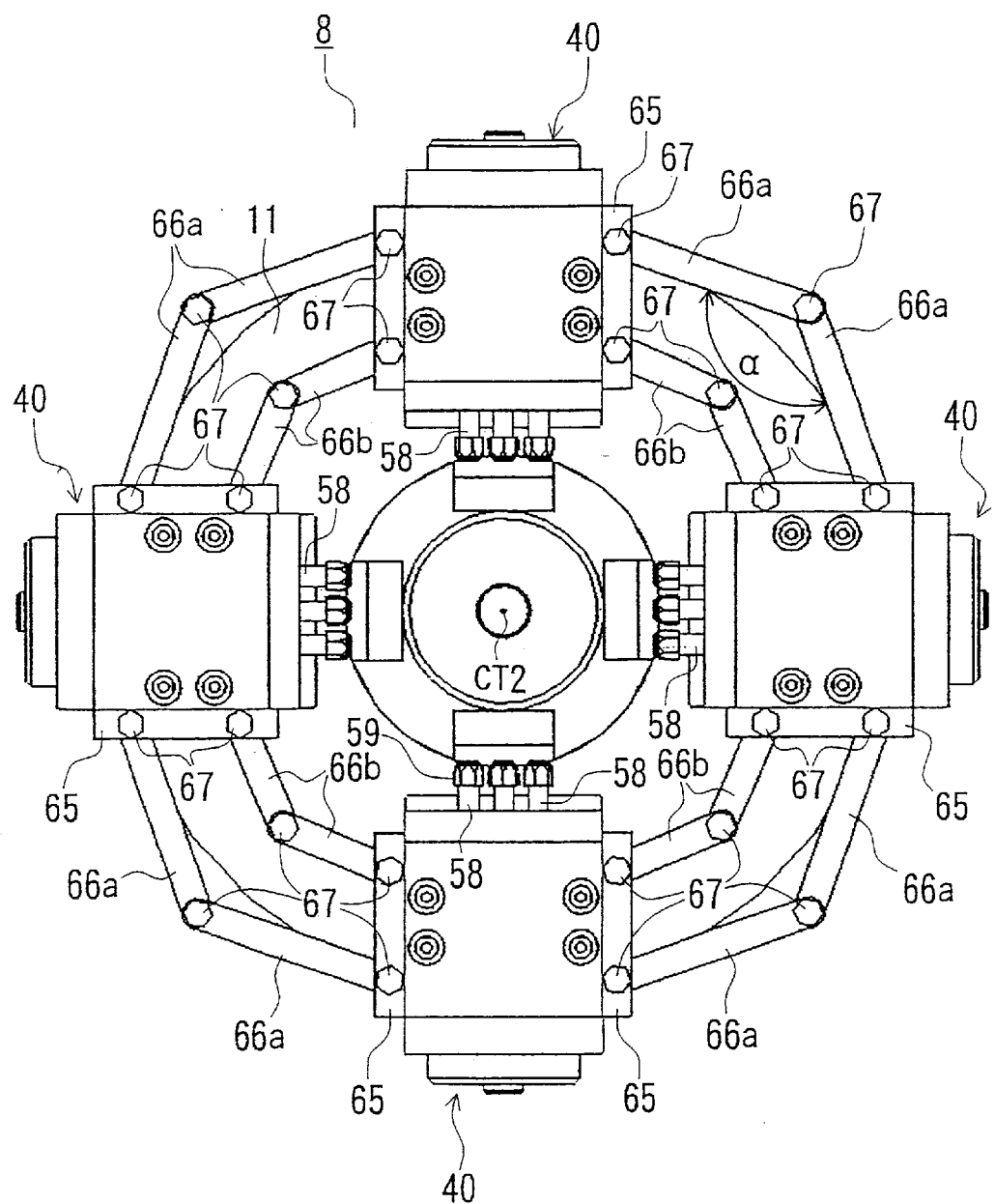
FIG. 19 is a front elevation of the chuck unit for lathe as shown in FIG. 18.

FIGS. 18 and 19 show a third embodiment of the chuck unit according to the invention. FIG. 18 is a perspective view showing the third embodiment, namely a chuck unit for lathe applying the invention, and FIG. 19 is a front elevation of the chuck unit as shown in FIG. 18.

The difference between the chuck unit 8 in this embodiment and the chuck unit 8 in the second embodiment is that the chuck unit 8 in this embodiment has 4 (four) forth jaws 40 and flexibly arranged pipes 70, 71 made of metal, connecting the respective jaws 40. The inside structure of the chuck unit 8 and the inside structure of the fourth jaw 40 can be the same as the ones described above in the second embodiment. So, the explanation of the same as FIGS. 12, 13 is omitted, attaching the same numbers. Supporting means for the arranged pipe will now be explained.

The flexible arranged pipes 70, 71 have a hollow holder 65 fixed at both side faces of each fourth jaw 40. Hollow arms 66a, 66a and 66b, 66b of respectively different lengths, are supported by each holder 65 through hollow pins 67, 67, and are free to oscillate. The arms 66a, 66a and the arms 66b, 66b which are respectively supported by the faces opposing to the forth jaws 40 adjacent to each other, are respectively connected with each other. These are free to oscillate by the hollow pin 67 at the intermediate portion between the fourth jaws 40 that are adjacent to each other.

Two fluid supply passages (not shown) for compressed air are formed inside the holder 65, the arm 66a and the pin 67 of the flexible arranged pipe 70. The adjacent fourth jaws 40 are connected with each other through the passages. A fluid supply passage for oil pressure also is formed inside the holder 65, the arm 66b and the pin 67, further connecting the adjacent fourth jaws 40 with each other.

In order to protect these flexible arranged pipes 70, 71 from chips generated by machining operations on the workpiece, a cover (not shown) can be fixed by the main body 11, covering the movement area of the flexible arranged pipes.

The chuck unit 8 in this embodiment may be operable such that a pair of two fourth jaws 40 and their workpiece holding rods 59 (the piston rods 58) that face each other, may be used independently of the other pair of two fourth jaws 40. Operation is otherwise similar to using all four of these jaws. In any event, the operable fourth jaws are driven and moved in a radial direction relative to axial center CT2.

When the fourth jaws 40 are moved in the radial direction with respect to the axial center CT2, the connecting angles a (see FIG. 19) between the arms 66a, 66a of the flexible arranged pipe 70 and between arms 66b, 66b of the flexible arrange pipe 71 are respectively changed so as to cope with the change of the space between the respective fourth jaws 40. Therefore, it is also sufficiently cope with the independent movement of two pairs of the fourth jaws 40 in the radial direction.

Similar effects as with the second embodiment can be obtained. Besides, it is possible to cope with the workpiece having various shapes of section by independently moving the two pairs of the fourth jaws 40 in the radial direction.

The arranged pipes for air pressure and for oil pressure are respectively formed by flexible arranged pipes, made of metal, so their strength is high. And, the chuck unit 8 can be made smaller in comparison with the arranged pipes made of synthetic resin, by making the flexible arranged pipes 70, 71 thinner. Besides, the workpiece holding unit can be certainly operated.

The structure of the chuck unit 8 in the embodiment as shown in FIGS. 1 through 11 may be such that a communicating pipe is provided for coupling the cylinders 25b of the three third jaws 25, and all of the piston rods 25g (workpiece holding rods) provided at the three third jaws 25 are operated by the operation of the operation rod 25d of one of the third jaws 25. Therefore, the structure of the chuck unit 8 is made simple since the operation rod 25d may be located at one of the three third jaws 25, that is, only one may need to be provided for the chuck unit 8.

In that case, the workpiece holding member 25, 40 are moved and driven in the direction shown by the arrows C and D which is the radial direction with respect to the member moving mechanism of FIG. 1, provided between the sliding member 21 and the workpiece holding members 25, 40, such as 22, 23 and 25a. In addition to this structure, the member moving mechanism may move together with the workpiece holding members 25, 40 with respect to the sliding member 21 as shown in FIG. 20.

Furthermore, in an another structure, the center 15 may be provided together with the coil spring 16 in a sliding cylinder 300 which is free to move and drive in the axial center CT2 direction through a cylinder 301. The sliding cylinder 300 may be fixed by the fixing means 54b, similar to the fixing means 54b of the piston rod 58 for driving the workpiece holding rod 59, and a workpiece end face abutting face 300a in the shape of a panel may be formed at right angles with respect to the axial center CT2 at the top end of the sliding cylinder 300.

The workpiece end face abutting face 300a is provided, positioning the top end portion 7b of the workpiece 7 after finishing the first routine of machining, by abutting the workpiece end face against face 300a. By doing so, the workpiece 7 can be securely supported by the chuck unit 8 with the workpiece holding members 25, 40 and the workpiece end face abutting portion 300a.

Various kinds of supply methods are possible for supply of the working fluid for driving, fixing and holding the piston rod 58 of the workpiece holding rod 59 of the respective workpiece holding members 25, 40, such as oil pressure and air pressure. For instance, the working fluid may be charged in the cylinder 25b in the respective workpiece holding members 25, 40 as shown in FIG. 1. The working fluid may be supplied from an outside through the operating jig 27 or the like as shown in FIG. 14, or a supply passage of the working fluid may be provided in the chuck unit 8 so as to supply working fluid from an outside means, through the chuck unit 8.

The invention has been explained on the basis of the embodiments heretofore. These embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

We claim:

1. Chuck unit for machine tool, capable of holding a workpiece, being installed on a spindle rotatably supported, comprising: a main body being free to rotate and drive with an axial center as its center; two or more sliding members provided on said main body, being free to move in a radial direction with respect to said axial center of said main body through sliding member driving means; workpiece holding member provided on said each sliding member, being capable of moving together with said sliding member; a plurality of workpiece holding rods provided on said workpiece holding member, being free to move and drive in said radial direction with said axial center as its center; said workpiece holding rod provided being free to move and drive by a fluid cylinder driving means; said fluid cylinder driving means having a cylinder formed in said each workpiece holding member; said workpiece holding rod being engaged with said cylinder being free to move and reciprocate; member moving mechanism provided between said sliding member and said workpiece holding member such that said respective workpiece holding members are free to independently move and drive in said radial direction with said axial center as its center by said member moving mechanism; said member moving mechanism having a adjustable screw mechanism rotatably provided between said sliding member and said workpiece holding member such that said workpiece holding member is free to move and drive with respect to said sliding member in said radial direction with said axial center of said main body as its center by operating said adjustable screw mechanism; said adjustable screw mechanism having a screw operation portion, operable by a rotating operation jig, rotatably provided at said machine tool, on an outer periphery side of said chuck unit; and a workpiece end face abutting means provided at said main body, being free to move, drive and fix in said axial direction of said main body, and a workpiece end face abutting face formed at an top end of said workpiece end face abutting means at right angle with respect to said axial center direction of said main body.

2. The chuck unit for machine tool as set forth in claim 1, wherein said sliding member driving means have first members being free to move in said axial center direction, an engagement portion is formed at said first members, and said sliding member is connected with said engagement portion.

3. The chuck unit for machine tool as set forth in claim 2, wherein a plurality of said sliding members is connected with said engagement portions, and a plurality of said sliding members is provided being free to synchronously move through said engagement portions by moving said first members in said axial center direction.

4. The chuck unit for machine tool as set forth in claim 1, wherein a piston is engaged with said cylinder, being free to drive and reciprocate from an outside by a piston operating means, and an operating portion is provided at said piston operating means, operable by a rotating operation jig rotatably and drivably provided at said machine tool.

5. The chuck unit for machine tool as set forth in claim 4, wherein said operating portion is located on an outer periphery side of said chuck unit.

6. The chuck unit for machine tool as set forth in claim 4, wherein said cylinder has a plurality of sub-cylinders, and said workpiece holding rod is engaged with said each sub-cylinder.

7. The chuck unit for machine tool as set forth in claim 1, wherein a workpiece core clamping member is provided at said main body, corresponding its axial center and said axial center of said main body with each other.

8. The chuck unit for machine tool as set forth in claim 1, wherein an energizing means, for energizing said workpiece holding rods from said axial center side in the direction of a retreated position, is provided at said workpiece holding rods.

9. The chuck unit for machine tool as set forth in claim 1, wherein said cylinders of said respective workpiece holding members are communicated and connected with each other among said respective workpiece holding members.

10. The chuck unit for machine tool as set forth in claim 4, wherein said cylinders of said respective workpiece holding members are communicated and connected with each other among said respective workpiece holding members, and said piston operation means is provided at only said cylinder provided at one workpiece holding member of said respective workpiece holding members.

11. A chuck unit for machine tool, capable of holding a workpiece, being installed on a rotatably supported spindle, the chuck unit comprising:

a main body that is free to rotate and drive with an axial center as its center;

two or more sliding members provided on said main body, being free to move in a radial direction with respect to said axial center of said main body through sliding member driving means;

a workpiece holding member provided on each said sliding member, the workpiece holding member being free to move together with said sliding member;

a plurality of workpiece holding rods provided on said workpiece holding member, each said workpiece holding rod being free to move and drive in said radial direction through a cylinder;

outside fluid supply means connected with said cylinder, operable to supply said cylinder with fluid for driving said workpiece holding rod;

fixing means of said workpiece holding rod provided at said workpiece holding rod;

working fluid supply means connected with said fixing means, for working the fixing means;

wherein said outside fluid supply means has valve means, including a mechanism for controlling switching of said fluid for driving the workpiece holding rod via said cylinder;

said valve means having a mechanism of controlling supply of said working fluid for working the fixing means;

a common operation portion at said valve means, the common operation portion operating said mechanism of controlling switching and operating said mechanism of controlling supply; and, a receiving portion of said fluid for driving said workpiece holding rod, formed with said common operation portion.

12. The chuck unit for machine tool as set forth in claim 11, wherein said common operation portion of said valve means has a driving force receiving portion for receiving a first driving force for driving said mechanism of controlling switching, and said driving force receiving portion also serves as a driving force receiving portion for receiving a second driving force for driving said mechanism of controlling supply.

13. Chuck unit for machine tool, capable of holding a workpiece, being installed on a spindle rotatably supported, comprising: a main body being free to rotate and drive with an axial center as its center; two or more sliding members provided on said main body, being free to move in a radial direction with respect to said axial center of said main body through sliding member driving means; workpiece holding member provided on said each sliding member, being free to move together with said sliding member; a plurality of workpiece holding rods provided on said workpiece holding member, being free to move and drive in said radial direction with said axial center as its center through a cylinder; outside fluid supply means connected with said cylinder, being free to supply said cylinder with fluid for driving workpiece holding rod from an outside; fixing means of said workpiece holding rod provided at said workpiece holding rod; working fluid supply means connected with said fixing means, for working and releasing working the fixing means; said cylinders of said respective workpiece holding members communicated and connected with each other among said respective workpiece holding members; and said fixing means of said respective workpiece holding members communicated and connected with each other among said respective workpiece holding members.

14. The chuck unit for machine tool as set forth in claim 13, wherein said outside fluid supply means have a valve means for changing supply form of said fluid for driving workpiece holding rod with respect to said cylinder, and said valve means also serves as said working fluid supply means.

15. The chuck unit for machine tool as set forth in claim 13, wherein said outside fluid supply means and said working fluid supply means for working and releasing working said fixing means are provided at only one of said workpiece holding members installed on said main body.

16. The chuck unit for machine tool as set forth in claim 1, wherein said workpiece holding member and said sliding member are unitedly formed with each other.

17. The chuck unit for machine tool as set forth in claim 11, wherein said workpiece holding member and said sliding member are unitedly formed with each other.

18. The chuck unit for machine tool as set forth in claim 13, wherein said workpiece holding member and said sliding member are unitedly formed with each other.

* * * * *